(12) United States Patent
Fujita et al.

(10) Patent No.: US 6,710,496 B2
(45) Date of Patent: Mar. 23, 2004

(54) STATOR FOR AN ALTERNATOR AND METHOD OF MANUFACTURING THE SAME

(75) Inventors: Masahiko Fujita, Tokyo (JP); Mitsuharu Hashiba, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 66 days.

(21) Appl. No.: 09/881,089

(22) Filed: Jun. 15, 2001

(65) Prior Publication Data
US 2002/0043886 A1 Apr. 18, 2002

(30) Foreign Application Priority Data
Oct. 16, 2000 (JP) ......................................... 2000-315043

(51) Int. Cl.$^7$ .............................................. H02K 17/00
(52) U.S. Cl. ....................................... 310/201; 310/208
(58) Field of Search ................................. 310/198, 201, 310/208, 260

(56) References Cited

U.S. PATENT DOCUMENTS

| | | | | |
|---|---|---|---|---|
| 3,453,468 A | * | 7/1969 | Lund ............................ | 29/596 |
| 4,827,172 A | * | 5/1989 | Kobayashi ........... | 174/DIG. 21 |
| 5,955,810 A | * | 9/1999 | Umeda et al. .............. | 310/201 |
| 5,965,965 A | * | 10/1999 | Umeda et al. .............. | 310/179 |
| 6,140,735 A | * | 10/2000 | Kato et al. .................. | 310/201 |

FOREIGN PATENT DOCUMENTS

| | | |
|---|---|---|
| JP | 63-194543 | 8/1988 |
| JP | 8-205441 | 8/1996 |
| JP | 2927288 | 5/1999 |

* cited by examiner

Primary Examiner—Dang Le
(74) Attorney, Agent, or Firm—Sughrue Mion, PLLC

(57) ABSTRACT

A stator for a alternator is provided wherein a height of coil ends may be reduced and it is difficult for conductors to interfere with each other at coil ends. A stator coil 18 thereof including wire-shaped conductors wound so as to alternately occupy an inner layer and an outer layer in a slot depth direction within the slots at intervals of a predetermined number of slots, the conductors being bent back outside the slots at axial end surfaces of a stator core 17 to form a plurality of turn portions, the plurality of turn portions being bent back in a similar shape inclined with respect to an outer circumferential surface of the stator core 17 and so as to align in rows in a circumferential direction to form coil end groups 19, and, a cross-section of at least a principal portion of the stator coil 13 inside the slots is approximately rectangular, a cross-section of at least a portion including end portions of the coil ends 19 is approximately circular or approximately elliptic, and a cross-sectional area of the approximately rectangular cross-sectional portion differs from that of the approximately circular cross-sectional portion or the approximately elliptic cross-sectional portion.

17 Claims, 18 Drawing Sheets

STATOR FOR AN ALTERNATOR AND METHOD OF MANUFACTURING THE SAME

BACKGROUND OF THE INVENTION

1. Field of the Invention

The present invention relates to a stator for an alternator, and, in particular, to a stator for an alternator including a plurality of turn portions which are bent back in a similar shape inclined with respect to an outer circumferential surface of a stator core and so as to align in rows in a circumferential direction and form coil end groups, and to a method for manufacturing the same

2. Description of the Related Art

FIG. 29 is a perspective view showing a coil end of a stator of a conventional automotive alternator described in, for example, Japanese Patent Publication 2927288. In coil ends of a stator coil constructed as above, when attempting to lower a height of the coil ends, since the conductors are rectangular in cross section at turn portions of the coil ends, adjacent conductors contact one another at corner portions thereof and damage an insulating coating, and further cause a short-circuit. Thus, there has been a problem in that (the height of) the coil ends could not be lowered.

Moreover, it is necessary to arrange the turn portions of the coil ends as adjacent conductors, and there is a problem in that during the bending process conductors interfere with one another at the turn portions due to irregularities in the bending process.

FIG. 30 is a perspective view showing a stator coil of a conventional automotive alternator described in Japanese Patent Application Laid-open No. Sho 63-194543. In this conventional example, in a stator coil provided in a stator and installed in a plurality of slots, after installing conductors of a circular cross section in slots, the cross sections are pressure formed into approximately rectangular shapes and the space factor is improved. However, since the winding method for this sort of stator coil is concentrated winding in which a plurality of turns of winding are made in succession in similar teeth, the stator coil does not include (turn portion) which are bent back in a similar shape so as to be inclined with respect to an outer circumferential surface of a stator core and so as to line up in rows in a circumferential direction and form a plurality of coil ends, and no particular effects are achieved by the roughly circular cross-sectional shape of the turn portions.

The conventional stator for an alternator shown in FIG. 29 exhibits the following problems, namely:

since the conductors have a rectangular cross section at the turn portions of the coil ends, adjacent conductors contact one another at corner portions thereof and damage an insulating coating, and further cause a short-circuit, hence, (the height of) the coil ends cannot be lowered;

it is necessary to arrange the turn portions of the coil ends as adjacent conductors, and during the bending process conductors interfere with one another at the turn portions due to irregularities in the bending process;

the axial dimension of the stator is increased because the height of the coil ends cannot be decreased;

since the height of the coil ends cannot be decreased, the length of the coil is increased and the resistance thereof increases, output is reduced during power generation, and an increase in generated heat is incurred;

since the height of the coil ends cannot be decreased, coil end leakage inductance increases and output is reduced;

since the height of the coil ends cannot be decreased, the length of the conductor is increased and the cost of the copper wire material increases;

since the height of the coil ends cannot be decreased, the ventilating resistance of the cooling air increases and cooling characteristics are degraded; and since the height of the coil ends cannot be decreased, the flow of the cooling air is disturbed (made turbulent) by the coil ends and wind noise increases.

SUMMARY OF THE INVENTION

The present invention aims to solve the above problems with the conventional art and an object of the present invention is to provide a stator for an alternator, and method for manufacturing the same, in which: it is possible to increase a space factor of a stator coil in slots and increase a cross-sectional area of the stator coil and thus, a resistance of the stator coil may be reduced and an output voltage increased; it is possible to increase a thickness of stator teeth and thus, magnetic resistance of magnetic flux interlinking the stator coil may be reduced, and further, since magnetic flux density is reduced such that is difficult for magnetic saturation to occur, output may be increased; furthermore, since it is made difficult for conductors to interfere with one another at coil ends, a height of the coils ends may be reduced and the size of the entire alternator may also be reduced; since it is possible to reduce the height of the coil ends, coil resistance and coil end leakage inductance may be reduced and output may be increased; further, because an amount of material may be reduced, it is possible to lower the cost; also, even in the case where conductors contact one another, since the conductors are of an approximately circular cross section with a large radius of curvature, the contact stress is small and it is difficult for the insulating coating to become damaged; moreover, because a cross section of an intersecting portion of adjacent coil ends is roughly circular, it is difficult for forming irregularities to cause a difference in shape in the coil ends and the forming of the coil is simplified.

In order to achieve the above object, according to one aspect of the present invention, there is provided, a stator for an alternator comprising:

a stator core fixed to a case and facing a rotor, and formed in a circumferential direction with a number of radially extending slots of a rectangular cross section; and a stator coil installed in the slots of the stator core; and the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction and form coil end groups, and, a cross-section of at least a principal portion of the stator coil inside the slots is approximately rectangular, a cross-section of at least a portion including end portions of the coil ends is approximately circular or approximately elliptic, and a cross-sectional area of the approximately rectangular cross-sectional portion differs from that of the approximately circular cross-sectional portion or the approximately elliptic cross-sectional portion.

According to another aspect of the present invention there is provided a stator for an alternator wherein:

a cross section the conductors comprising the coil ends is approximately circular or approximately elliptic throughout a substantial entirety of the conductors.

According to yet another aspect of the present invention there is provided a stator for an alternator wherein:

a cross-sectional area of the conductors inside the slots is larger than a cross-sectional area of the conductors comprising the coil ends.

According to still yet another aspect of the present invention there is provided a stator for an alternator wherein:

the stator coil comprises a plurality of U-shaped conductor segments, end portions thereof being joined to each other, and a cross section of at least a portion including ends of turn portions of the U-shaped conductor segments is approximately circular or approximately elliptic.

According to still yet another aspect of the present invention there is provided a stator for an alternator wherein:

a cross section of end portions of the U-shaped conductor segments is approximately circular or approximately elliptic.

According to still yet another aspect of the present invention there is provided a stator for an alternator wherein:

the stator coil comprises a continuous conductor wound so as to alternately occupy an inner layer and an outer layer in a slot depth direction within the slots at intervals of a predetermined number of slots, the conductor being bent back outside the slots at both sides of the stator core.

According to still yet another aspect of the present invention there is provided a stator for an alternator wherein:

a plurality of the conductors are disposed in a radial direction of the slots, and a cross section of the conductors in the slots is an approximately rectangular shape having long sides in a radial direction.

According to still yet another aspect of the present invention there is provided a stator for an alternator wherein:

the conductors comprise four (4) or more layers in the slots, and the stator coil comprises two (2) or more rows of coil end groups.

According to still yet another aspect of the present invention there is provided a stator for an alternator wherein:

a hardness of the conductors of the coil ends is less than that of the conductors in the slots.

According to still yet another aspect of the present invention there is provided a stator for an alternator wherein:

the rotor further comprises a air-cooling fan being rotationally driven together with the rotor.

According to still yet another aspect of the present invention there is provided a stator for an alternator wherein:

a varnish or resin is applied to the coil end groups.

According to still yet another aspect of the present invention there is provided a stator for an alternator wherein:

portions corresponding to coil ends in conductors of an approximately rectangular cross section throughout are pressed and made to an approximately circular cross section or approximately elliptic cross section.

According to still yet another aspect of the present invention there is provided a stator for an alternator wherein:

portions of conductors of an approximately circular cross section throughout installed in the slots are pressed and made to an approximately rectangular cross section.

According to still yet another aspect of the present invention there is provided a stator for an alternator wherein:

portions of conductors installed in the slots are pressed so as to make a cross-sectional area thereof larger than a cross-sectional area of conductors of the coil ends.

According to still yet another aspect of the present invention there is provided a stator for an alternator wherein:

portions of conductors of an approximately circular cross section throughout are installed in the slots and pressed to an approximately rectangular cross section.

According to still yet another aspect of the present invention there is provided a stator for an alternator wherein:

only portions of conductors of an approximately circular cross section throughout installed in the slots are changed to a wave shape, after which the wave shape portion is pressed to an approximately rectangular cross section.

According to still yet another aspect of the present invention there is provided a stator for an alternator wherein:

portions of conductors of an approximately circular cross section throughout installed in the slots are changed into a shape of large cross section and then pressed to an approximately rectangular cross section.

According to still yet another aspect of the present invention there is provided a method of manufacturing a stator for an alternator including, in a stator for an alternator comprising:

a stator core fixed to a case and facing a rotor, and formed in a circumferential direction with a number of radially extending slots of a rectangular cross section; and a stator coil installed in the slots of the stator core; and the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction and form coil end groups, and, a cross-section of at least a principal portion of the stator coil inside the slots is approximately rectangular, a cross-section of at least a portion including end portions of the coil ends is approximately circular or approximately elliptic, and a cross-sectional area of the approximately rectangular cross-sectional portion differs from that of the approximately circular cross-sectional portion or the approximately elliptic cross sectional portion, a circular shape forming process for pressing portions corresponding to coil ends in the conductors of an approximately rectangular cross section throughout into an approximately circular cross section or approximately elliptic cross section.

According to still yet another aspect of the present invention there is provided a method of manufacturing a stator for an alternator including, in a stator for an alternator comprising:

a stator core fixed to a case and facing a rotor, and formed in a circumferential direction with a number of radially extending slots of a rectangular cross section; and a stator coil installed in the slots of the stator core; and the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction and form coil end groups, and, a cross-section of at least a principal portion of the stator coil inside the slots is approximately rectangular, a cross-section of at least a portion including end portions of the coil ends is approximately circular or approximately elliptic, and a cross-sectional area of the approximately rectangular cross-sectional portion differs from that of the approximately circular cross-sectional portion or the approximately elliptic cross-sectional portion, a rectangular shape forming process for pressing portions of conductors of an approximately circular cross section throughout to be installed in the slots into an approximately rectangular cross section.

According to still yet another aspect of the present invention there is provided a method of manufacturing a stator coil for an alternator wherein:

the rectangular shape forming process presses portions of the conductors installed in the slots so as to make a cross-sectional area thereof larger than a cross-sectional area of the conductors of the ends.

According to still yet another aspect of the present invention there is provided a method of manufacturing a stator coil for an alternator wherein:

the rectangular shape forming process presses conductors of an approximately circular cross section throughout to an approximately rectangular cross section after the conductors are installed in the slots.

According to still yet another aspect of the present invention there is provided a method of manufacturing a stator coil for an alternator wherein:

in the rectangular shape forming process, only portions of conductors of an approximately circular cross section throughout installed in the slots are processed to a wave shape, after which the wave shape portion is pressed to an approximately rectangular cross section.

According to still yet another aspect of the present invention there is provided a method of manufacturing a stator coil for an alternator wherein:

in the rectangular shape forming process, portions of conductors of an approximately circular cross section throughout installed in the slots are processed into a shape of large cross section and then pressed to an approximately rectangular cross section.

BRIEF DESCRIPTION OF THE DRAWINGS

FIG. 6a is a cross section taken along the line A—A in FIG. 6; FIG. 6b is a cross section taken along the line B—B in FIG. 6.

DETAILED DESCRIPTION OF THE PREFERRED EMBODIMENTS

Embodiment 1

Figure 1:
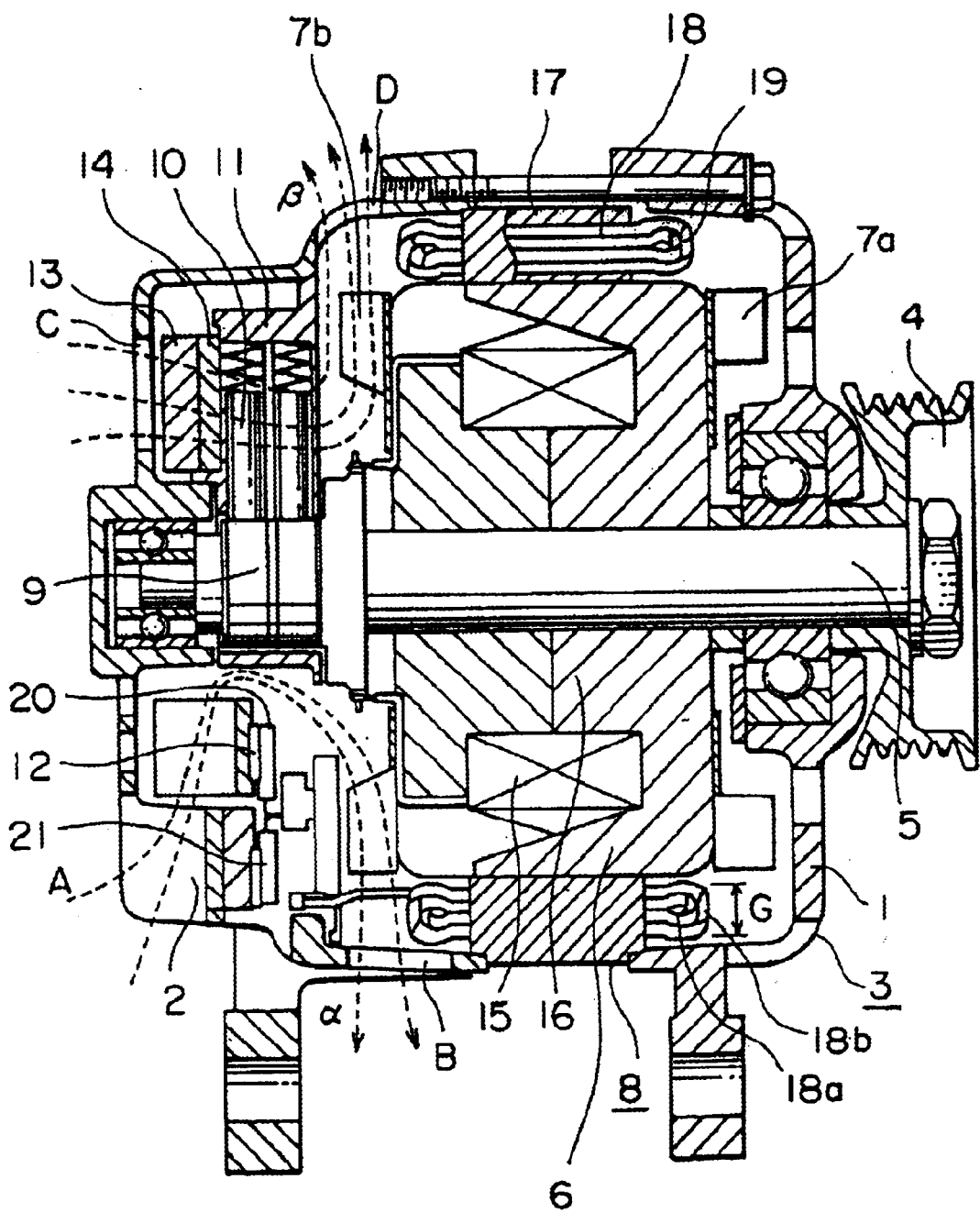
FIG. 1 is a cross-sectional view showing an automotive alternator for use in an automobile according to Embodiment 1 of the present invention.

FIG. 1 is a cross section showing an automotive alternator of the present invention. This automotive alternator includes, a case 3 constructed from an aluminum frame 1 and frame 2, a shaft 5 with a pulley 4 fixed on one end thereof provided inside the case 3, a claw-pole rotor 6 fixed to the shaft 5, fans 7a, 7b fixed on respective axial end surfaces of the rotor 6, a stator core 17 fixed inside the case 3, a stator coil 18 received in slots of the stator core 17, a stator 8 constructed from the stator core 17 and the stator coil 18, a slip-ring 9 fixed on the other end of the shaft 5 for supplying electric current to the rotor 6, a pair of brushes 10 for slidingly contacting the slip-ring 9, a brush holder 11 for receiving the brushes 10, a rectifier 12 electrically connected to the stator coil 18 for rectifying an alternating current produced in the stator coil 18 into a direct current, a heat sink 13 fitted to the brush holder 11, and a regulator 14 attached to the heat sink 13 for adjusting the alternating voltage produced in the stator coil 18.

The rotor 6 includes a rotor coil 15 for flowing an electric current to generate magnetic flux and a pole core 16 which houses the rotor coil 15 and forms magnetic poles in accordance with magnetic flux. The fans 7a, 7b for cooling are provided at respective axial end surfaces of the pole core 16.

The stator 8A includes the stator core 17, through which passes a rotating magnetic field in accordance with the rotor 6, and the stator coil 18 which flows an alternating current output in accordance with the rotating magnetic field, and the stator coil 18 forms coil ends 19 at both axial ends of the stator core 17.

Diodes 20 connected to the stator coil 18 and a heat sink 21 for dissipating heat of the diodes 20 are provided in the rectifier 12.

Figure 19:
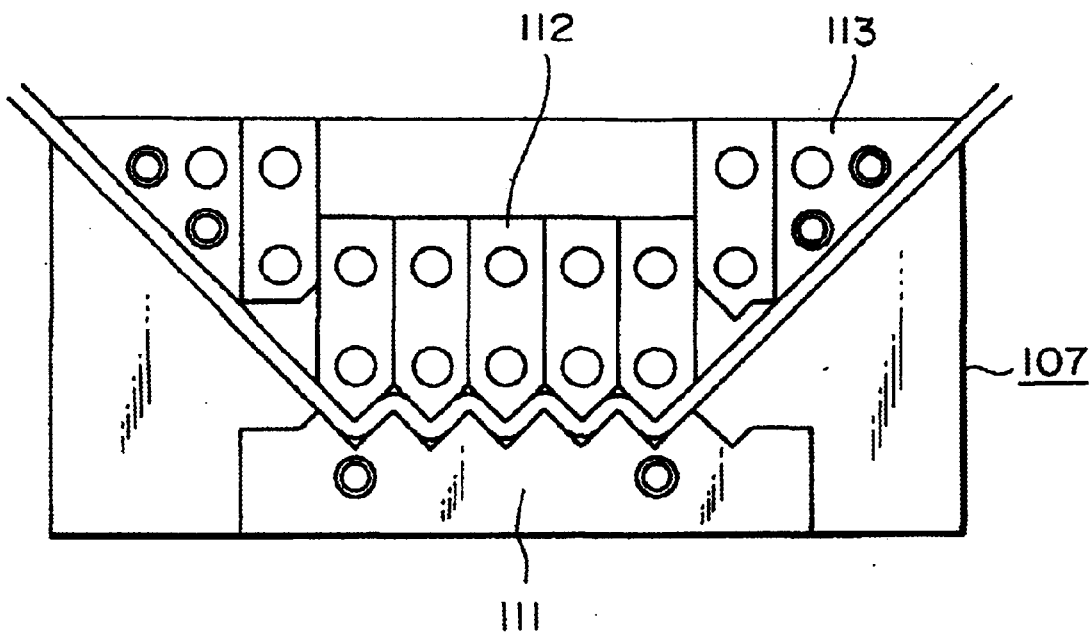
FIG. 19 is a schematic drawing showing sequential forming of a conductor of a stator of an alternator according to Embodiment 14 of the present invention.
Figure 20:
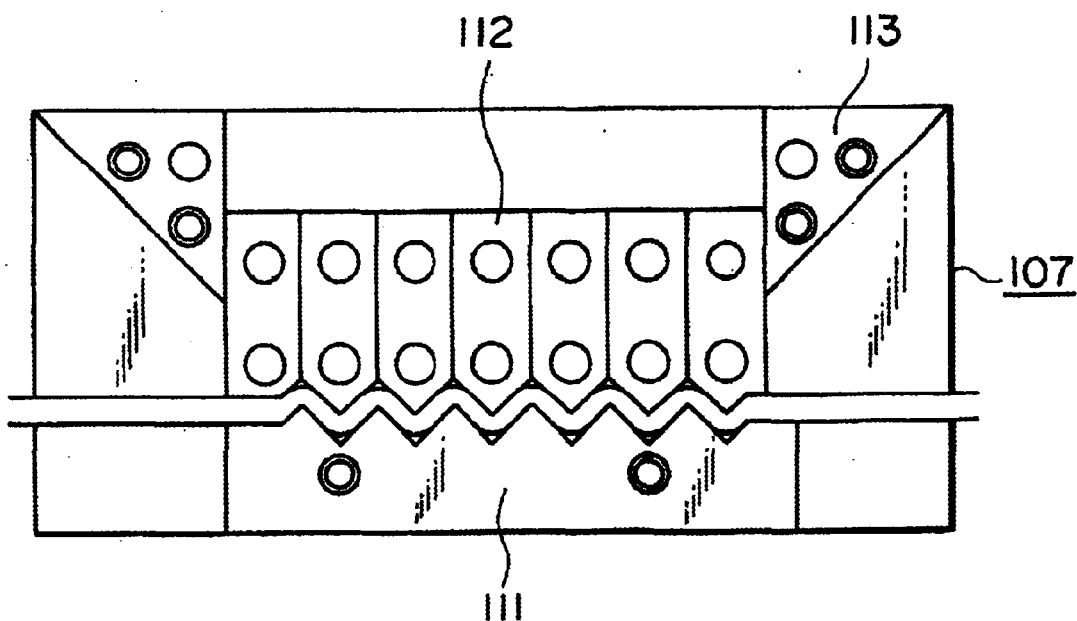
FIG. 20 is a schematic drawing showing sequential forming of a conductor of a stator of an alternator according to Embodiment 14 of the present invention.

In an automotive alternator constructed as above, as shown in FIG. 19, cooling air flows into the case 3 from openings A of the case 3 in accordance with rotation of the fan 7b which rotates together with rotation of the rotor 6. This cooling air flows as shown by the arrow α and cools the heat sink 21 and diodes 20. Then, the cooling air is flowed in an outside radial direction by the fan 7b and is discharged to the outside from an opening B. Moreover, cooling air also flows into the case 3 from an opening C in accordance with rotation of the fan 7b and this cooling air flows as shown by the arrow β and cools the heat sink 13 and power transistors of the regulator 14. Then, this cooling air is flowed in an outside radial direction by the fan 7b and is discharged to the outside from an opening D.

Figure 2:
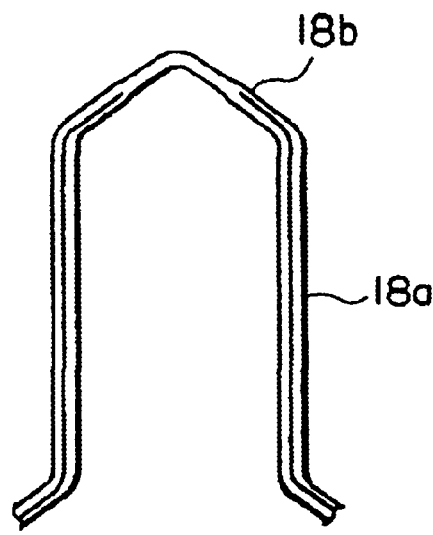
FIG. 2 is a side elevation showing an essential portion of a conductor constructing a stator coil.

FIG. 2 is a side elevation showing an essential portion of a conductor constructing the stator coil 18. The stator coil 18 comprises conductors wound so as to alternately occupy an inner layer and an outer layer in a slot depth direction within the slots at intervals of a predetermined number of slots, the conductors being bent back outside the slots at axial end surfaces of the stator core 17, and the conductors including straight portions 18a for installation in the slots and turn portions 18b being bent back outside the slots.

Figure 3:
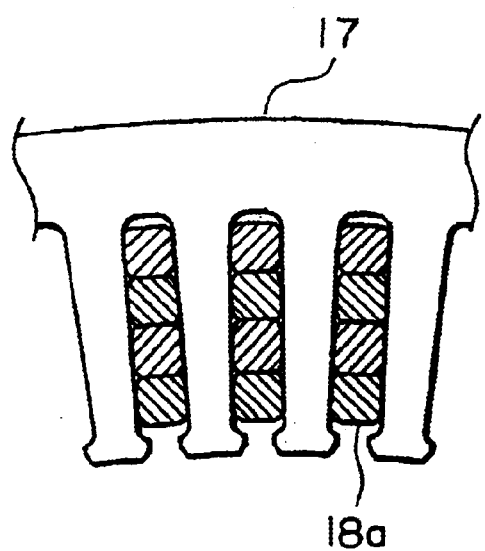
FIG. 3 is a cross-sectional view of an essential portion showing a condition in which straight portions are installed in slots of a stator core

FIG. 3 is a cross-sectional view of an essential portion showing a condition in which straight portions 18a are installed in slots of the stator core 17. The straight portions 18a are installed in four (4) layers in slots.

Figure 4:
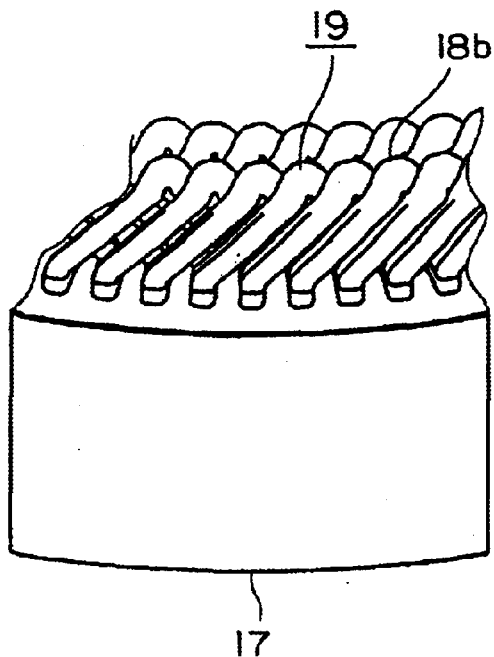
FIG. 4 is a perspective view showing an essential portion of a coil end.

FIG. 4 is a perspective view showing an essential portion of the coil end 19. The plurality of turn portions 18a are bent back in a similar shape inclined with respect to an outer circumferential surface of a stator core 17 and align in rows in a circumferential direction to form groups of the coil ends 19. The groups of the coil ends 19 are formed so as to align in two (2) rows in a radial direction.

In the present embodiment, in the coil ends 19, portions including ends of turn portions 18a are made circular in cross section. Other portions of the stator coil 18 are of a rectangular cross section. A cross-sectional area of the portion having a circular cross section is larger than that of the portion(s) having a rectangular cross section.

In the stator 8 for an alternator constructed as above, the stator 8 for an alternator comprises:

the stator core 17 fixed to the case 3 and facing a rotor 6, and formed in a circumferential direction with a number of radially extending slots of a rectangular cross section; and the stator coil 18 installed in the slots of the stator core 17; and the stator coil 18 comprises wire-shaped conductors wound so as to alternately occupy an inner layer and an outer layer in a slot depth direction within the slots at intervals of a predetermined number of slots, the conductors being bent back outside the slots at axial end surfaces of the stator core 17 to form a plurality of turn portions 18b, the plurality of turn portions 18b being bent back in a similar shape inclined with respect to an outer circumferential surface of the stator core 17 and so as to align in rows in a circumferential direction to form groups of coil ends 19, and, the cross-section of the stator coil inside the slots is approximately rectangular and the cross-section of the stator coil including end portions of the coil ends is circular.

In the above stator 8, since a cross-section of the stator coil 18 inside the slots is approximately rectangular, it is possible to increase a space factor of the stator coil in the slots and increase a cross-sectional area of the stator coil and thus, a resistance of the stator coil 18 maybe reduced and an output voltage increased. Moreover, since it is possible to increase a thickness of teeth of stator 8, magnetic resistance of magnetic flux interlinking the stator coil 18 may be reduced, and further, since magnetic flux density is reduced such that is difficult for magnetic saturation to occur, output may be increased. Furthermore, because a cross section of the stator coil 18 at the coil ends 19 is approximately circular or approximately elliptic, it is made difficult for conductors to interfere with one another, a height of the coils ends 19 may be reduced and the size of the entire alternator may also be reduced. Also, since it is possible to reduce the height of the coil ends 19, coil resistance and coil end leakage inductance may be reduced and output may be increased. Further, because an amount of material may be reduced, it is possible to lower the cost. And even in the case where conductors contact one another, since the conductors are of an approximately circular cross section with a large radius of curvature, the contact stress is small and it is difficult for the insulating coating to become damaged. Moreover, because a cross section of an intersecting portion of adjacent coil ends 19 is roughly circular, it is difficult for forming irregularities to cause a difference in shape in the coil ends and the forming of the coil is simplified.

Also, in the conductors of present embodiment, a hardness at the coil ends 19 is less than that in the slots. Hence, bending of the coil ends 19 is facilitated.

Moreover, although in the present embodiment the cross-section of a portion including end portions of the coil ends 19 is circular, similar effects may be obtained with an approximately circular cross section or an approximately elliptic cross section as well.

Embodiment 2

Figure 5:
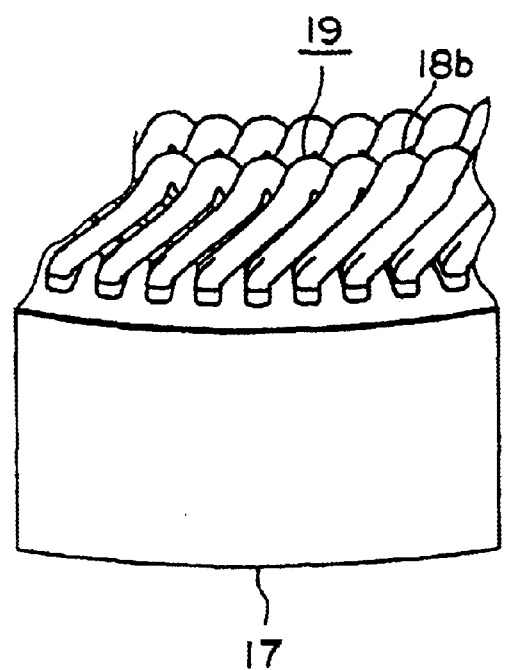
FIG. 5 is a perspective view showing an essential portion of a coil end of a stator of an alternator according to Embodiment 2 of the present invention.

FIG. 5 is a perspective view showing an essential portion of a coil end of a stator for an alternator according to Embodiment 2 of the present invention. In the present embodiment, conductors are of a circular cross section at a major portion of the coil ends 19.

In the stator for an alternator according to the present embodiment, the cross section the conductors comprising the coil ends is circular throughout a substantial entirety of the conductors. Hence, the forming of the coil is facilitated because it is difficult for differences in shape to develop due to forming irregularities in the coil ends.

Embodiment 3

Figure 6:
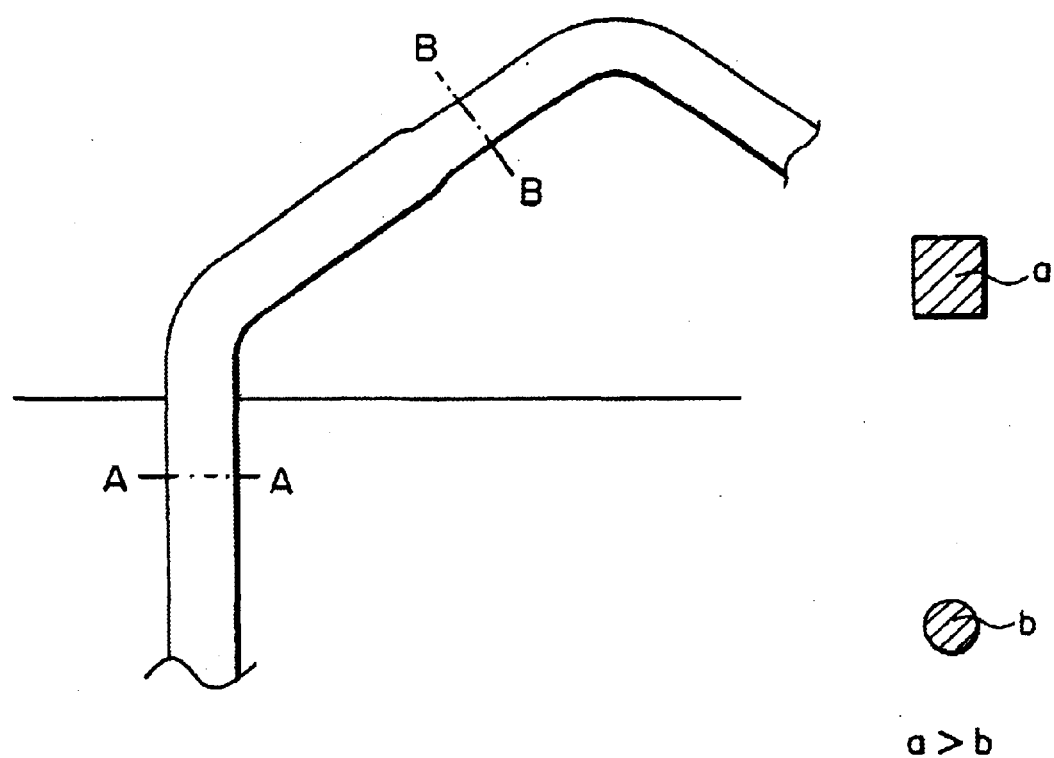
FIG. 6 is a schematic drawing showing a turn portion of a stator of an alternator according to Embodiment 3 of the present invention.

FIG. 6 is a schematic drawing showing a turn portion of a stator of an alternator according to Embodiment 3 of the present invention; FIG. 6a is a cross section taken along the line A—A in FIG. 6; FIG. 6b is a cross section taken along the line B—B in FIG. 6. In the present embodiment, a coil cross-sectional area a in the slots is larger than a coil cross-sectional area b at the coil ends 19.

In the stator for an alternator according to the present embodiment, the cross-sectional area a of the conductors inside the slots is larger than a cross-sectional area b of the conductors comprising the coil ends. That is, since there is a small cross-sectional area at the coil ends, it is difficult for conductors to interfere with one another, a height of the coils ends may be reduced and the size of the entire alternator may also be reduced. Further, because an amount of material may be reduced, it is possible to lower the cost.

Embodiment 4

Figure 7:
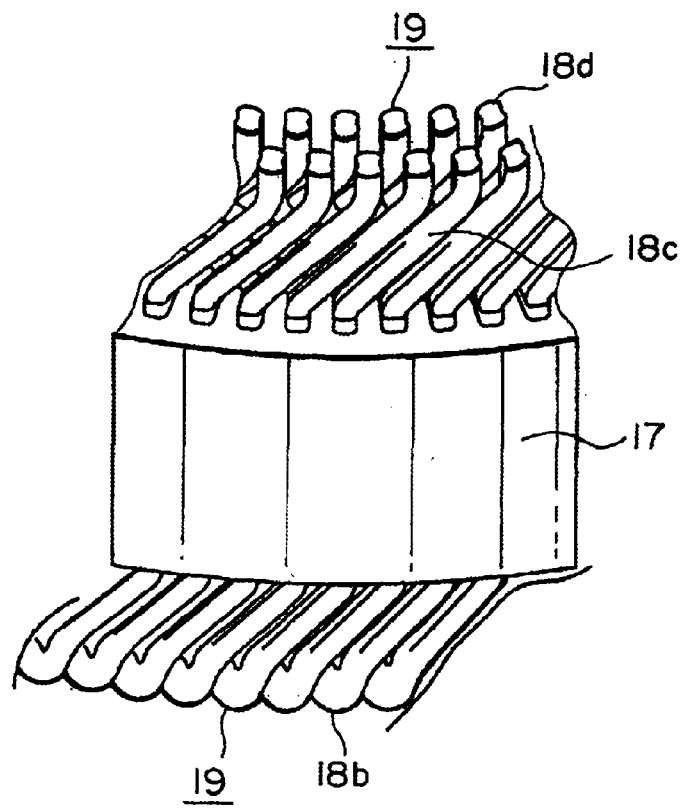
FIG. 7 is a perspective view showing an essential portion of a coil end of a stator for an alternator according to Embodiment 4 of the present invention.

FIG. 7 is a perspective view showing an essential portion of a coil end of a stator for an alternator according to Embodiment 4 of the present invention. In the present embodiment, a plurality of U-shaped conductor segments 18c are inserted in the stator core 17 (from below in FIG. 7) and end portions 18d are welded (at the upper portion in FIG. 7) to make a joined stator coil. End portions 18d of the joined conductor segments 18c are of a circular cross section before welding.

In the stator for an alternator according to the present embodiment, the stator coil comprises the plurality of U-shaped conductor segments 18c, end portions 18d thereof being joined to each other, and a cross section of a portion including ends of turn portions 18b of the U-shaped conductor segments is circular. Thus, since stator coil comprises a plurality of U-shaped conductor segments which are separate before being joined to each other, the cross-sectional shape is easily changed before the conductor segments 18c are formed into U-shapes.

Also, in the stator for an alternator according to the present invention, the cross section of end portions 18d of the U-shaped conductor segments is approximately circular or approximately elliptic. Thus, it is difficult for conductors at the joining side to interfere with one another after they are joined to each other. Also, welding of the joining portions is facilitated. Furthermore, compared to a coil of a rectangular cross section, it is difficult for corner portions to be scratched and alignment and the joining process are facilitated. Moreover, insertion in the rectifier connecting terminal of coil extending portions for connecting to the rectifier 12 is facilitated.

Embodiment 5

Figure 8:
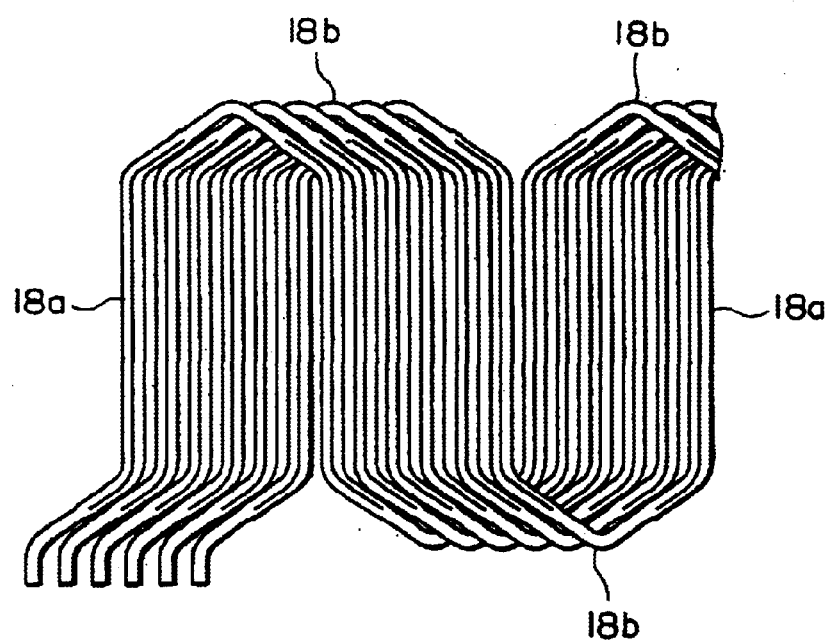
FIG. 8 is a schematic diagram showing a stator coil of a stator for an alternator according to Embodiment 5 of the present invention.

FIG. 8 is a schematic diagram showing a stator coil of a stator for an alternator according to Embodiment 5 of the present invention. In the present embodiment, the stator coil comprises a continuous conductor of alternately disposed straight portions 18a and turn portions 18b.

In the stator for an alternator according to the present embodiment, the stator coil comprises a continuous conductor wound so as to alternately occupy an inner layer and an outer layer in a slot depth direction within the slots at intervals of a predetermined number of slots, the conductor being bent back outside the slots at both sides of the stator core 17. Hence, since the stator coil comprises the continuous conductor, the height of the coil ends 19 can be reduced at both axial ends. Also, when mounting the coil in the slots, because a cross section of the coil has a large radius of curvature, it is possible to reduce contact stress and keep the coil form becoming damaged even in the case where coils contact each other at coil ends 19.

Embodiment 6

Figure 9:
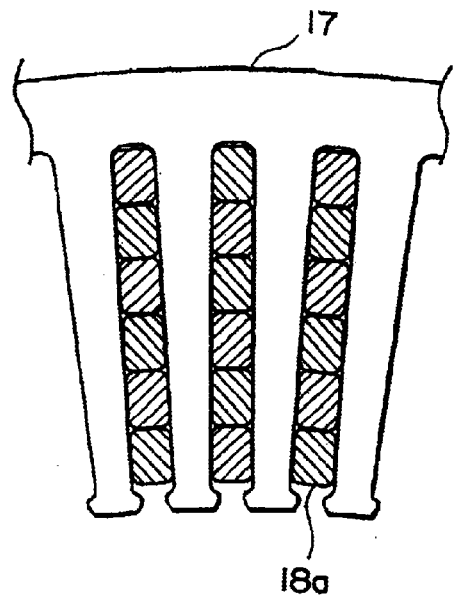
FIG. 9 is a cross section of an essential portion showing a condition in which straight portions are installed in slots of a stator for an alternator according to Embodiment 6 of the present invention.

FIG. 9 is a cross section an of essential portion showing a condition in which straight portions are installed in slots of a stator core of an alternator according to Embodiment 6 of the present invention. In the present embodiment, six (6) straight portions 18a of the stator coil are installed in each slot. The cross-sectional shape of the straight portions 18a is rectangular and this rectangular shape has long sides in a radial direction of the stator core 17.

In the stator for an alternator according to the present embodiment, six (6) layers of the conductors are disposed in a radial direction of the slots, and a cross section of the conductors in the slots is an approximately rectangular shape having long sides in a radial direction. Thus, since it is possible to maintain a cross-sectional area and enlarge the gap between coil ends, and further, since a height of the coil ends may be lowered and the teeth may be wide, it is difficult for magnetic saturation to occur and output is improved.

Embodiment 7

Figure 10:
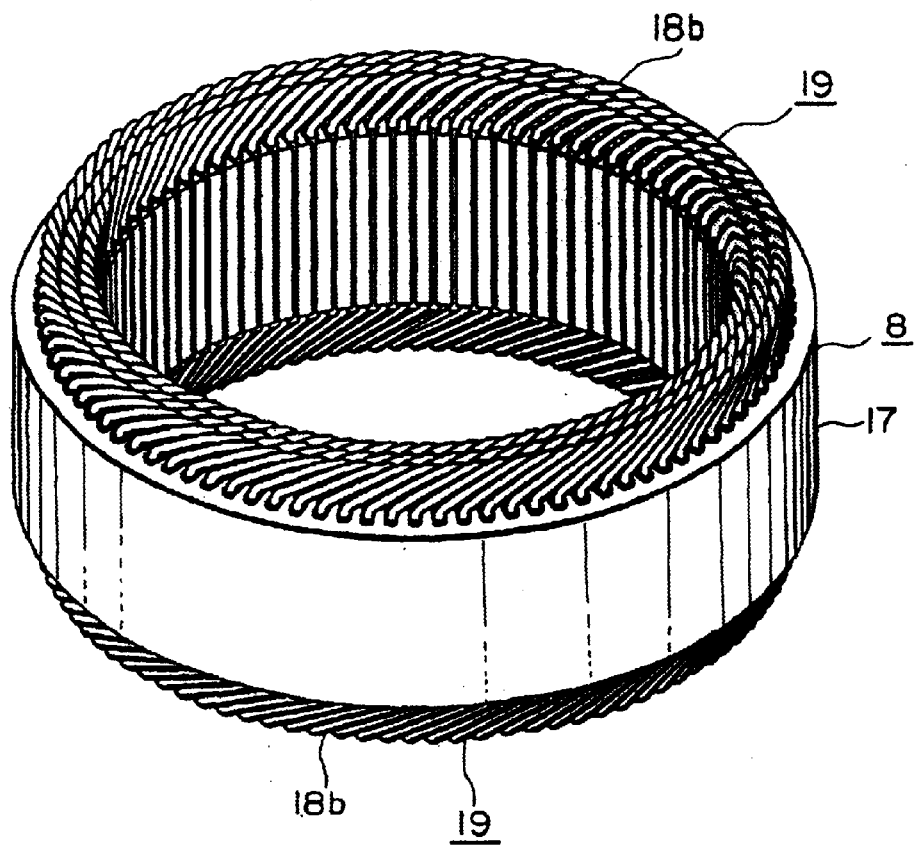
FIG. 10 is a perspective view showing a stator for an alternator according to Embodiment 7 of the present invention.

FIG. 10 is a perspective view showing a stator of an alternator according to Embodiment 7 of the present invention. In the present embodiment, six (6) straight portions of the stator coil are installed in each slot and three (3) rows of coil end groups 19 are formed.

In the stator for an alternator according to the present embodiment, the conductors comprise four (4) or more layers in the slots, and the stator coil comprises three (3) or more rows of coil end groups 19. Hence, interference among coil end groups 19 is avoided, and since a cross section of the conductors has a large radius of curvature, contact stress is reduced even in a case where coil end groups 19 contact one another and the coil may be prevented from being damaged. Also, since the number of turns is increased, the output may be increased, and a height of the coil ends may be lowered and the entire alternator may constructed in a small size.

Embodiment 8

Figure 11:
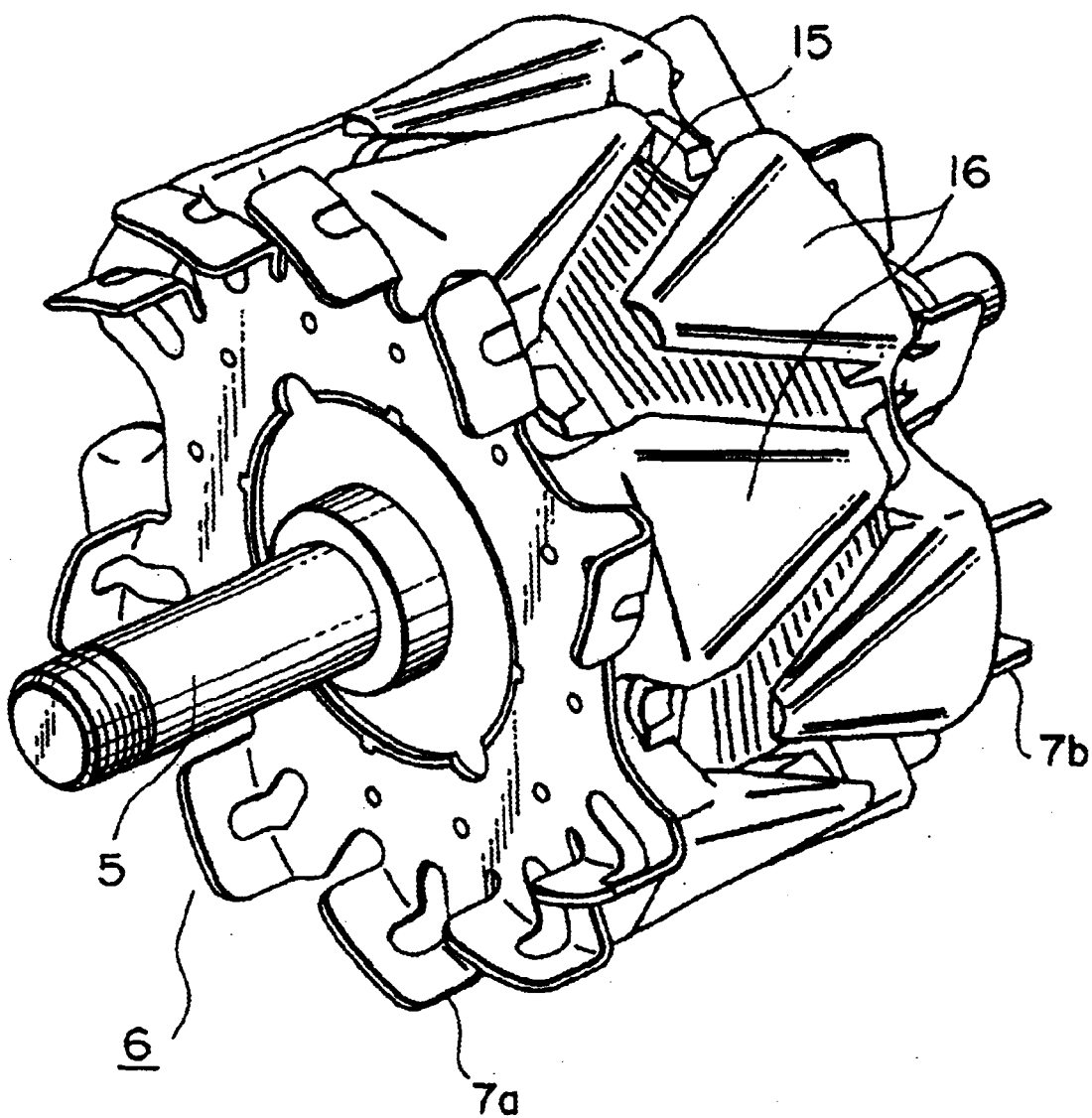
FIG. 11 is a perspective view showing a rotor of an alternator according to Embodiment 8 of the present invention.

FIG. 11 is a perspective view showing a rotor for an alternator according to Embodiment 8 of the present invention. In FIG. 11, air-cooling fans 7a, 7b are provided at axial ends of the rotor 6.

In the stator for an alternator according to the present embodiment, the rotor 6 includes an air-cooling fan being rotationally driven together with the rotor 6. Thus, because the air-cooling fans 7a, 7b are provided, the cool ends 19 may be positively cooled.

Embodiment 9

Figure 12:
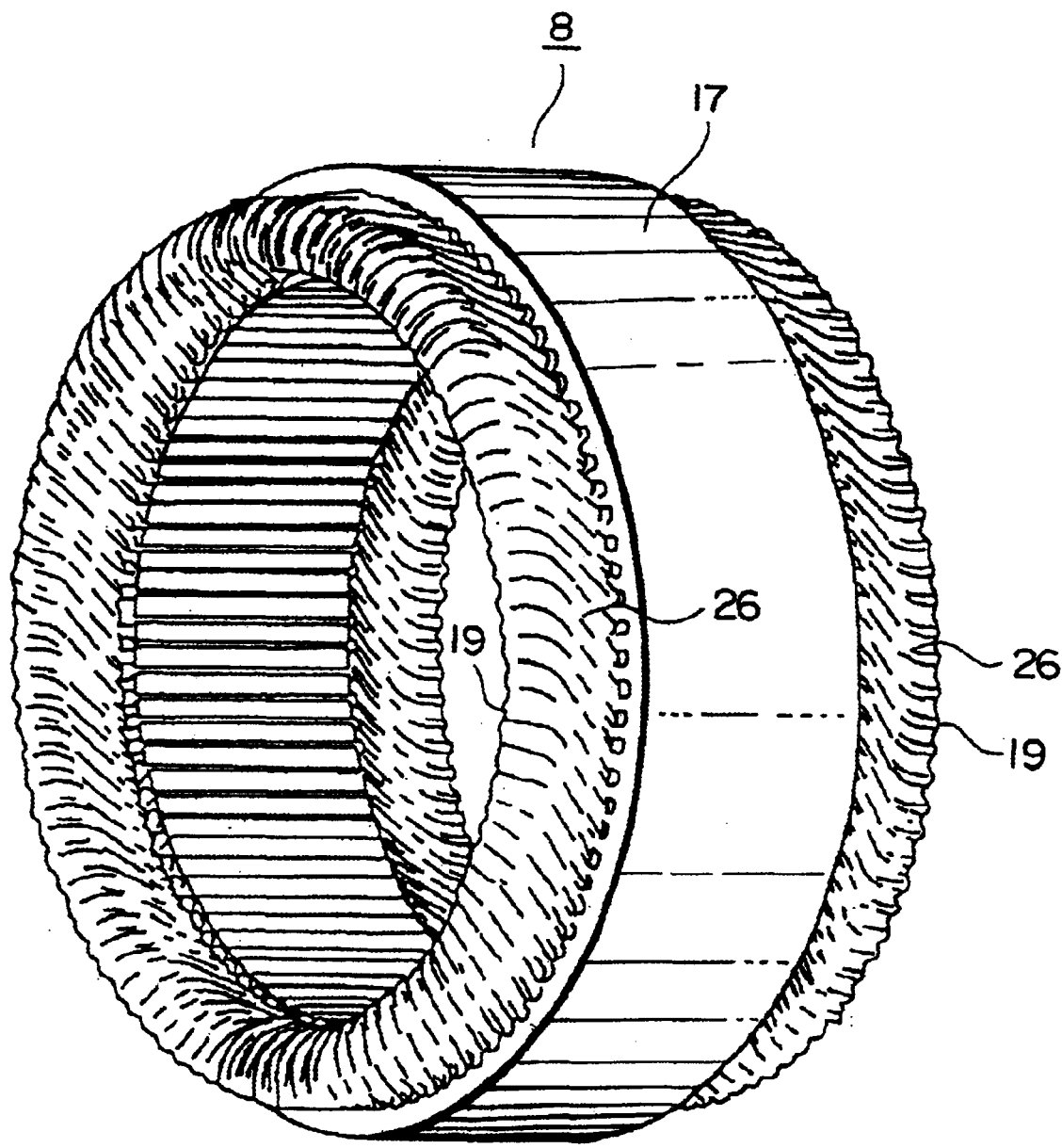
FIG. 12 is a perspective view showing a stator for an alternator according to Embodiment 9 of the present invention.

FIG. 12 is a perspective view showing a stator for an alternator according to Embodiment 9 of the present invention. In the present embodiment, a varnish 26 is provided to the coil ends 19.

In the stator 8 for an alternator according to the present embodiment, the varnish 26 is applied to the coil end groups 19. Thus, because gaps between coil ends 19 are embedded with varnish 26, insulating characteristics are improved. Moreover, the fixing strength of coil ends 19 to each other is increased and vibration resisting characteristics are improved.

Moreover, in the present embodiment, although the varnish 26 is provided to the coil ends 19, a resin which is not a varnish may also be used.

Embodiment 10

Figure 13:
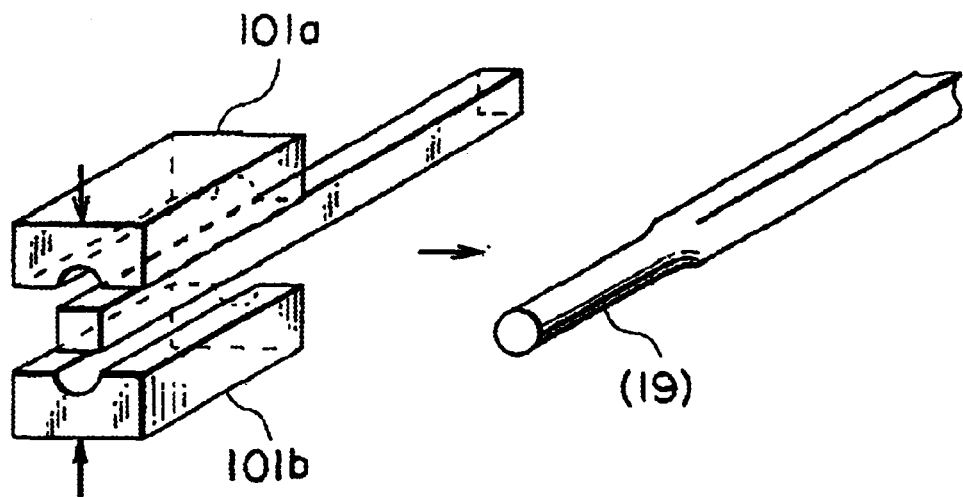
FIG. 13 is a schematic drawing showing a method of manufacturing a conductor of a stator for an alternator according to Embodiment 10 of the present invention.

FIG. 13 is a schematic drawing showing a method of manufacturing a conductor for a stator of an alternator according to Embodiment 10 of the present invention. In the present embodiment, portions of conductors having an approximately rectangular cross section throughout which are afterward to become coil ends 19 are placed between pressing dies 101a, 101b and pressed to a circular cross section.

In the stator for an alternator according to the present embodiment, portions corresponding to coil ends 19 in the conductors of an approximately rectangular cross section throughout are pressed to an approximately circular cross section or approximately elliptic cross section. Thus, the (number of) portions to be pressed are reduced and the forming process is facilitated.

Embodiment 11

Figure 14:
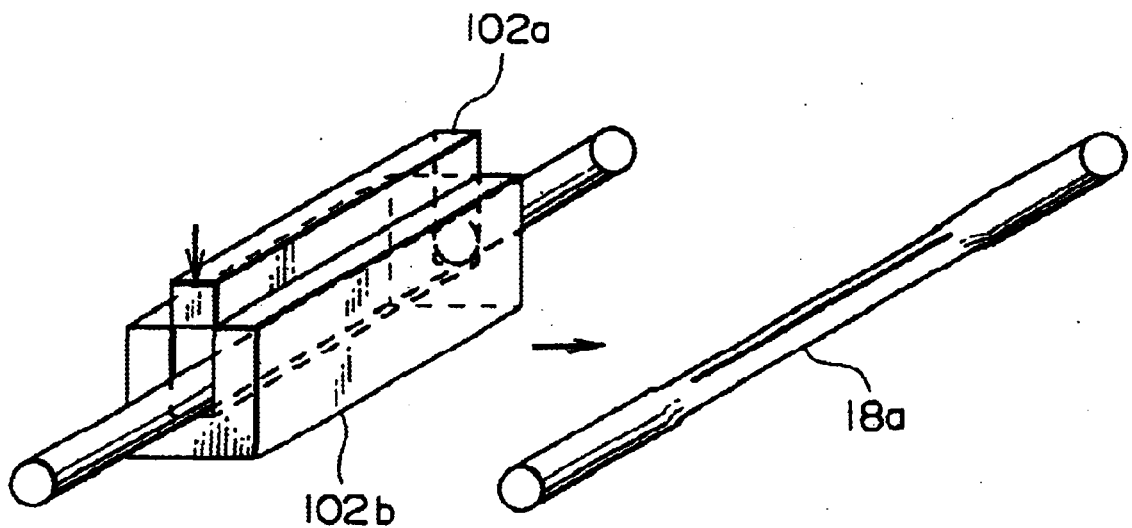
FIG. 14 is a schematic drawing showing a method of manufacturing a conductor of a stator for an alternator according to Embodiment 11 of the present invention.

FIG. 14 is a schematic drawing showing a method of manufacturing a conductor for a stator of an alternator according to Embodiment 11 of the present invention. In the present embodiment, portions of conductors of an approximately circular cross section throughout to be installed in the slots (straight portions 18a) are placed between pressing dies 102a, 102b and pressed to an approximately rectangular cross section.

In the stator for an alternator according to the present embodiment, the portions of the conductors of an approximately circular cross section throughout to be installed in the slots are pressed to an approximately rectangular cross section. Hence, the cost may be reduced because conductors of an approximately circular cross section are inexpensive.

Embodiment 12

Figure 15:
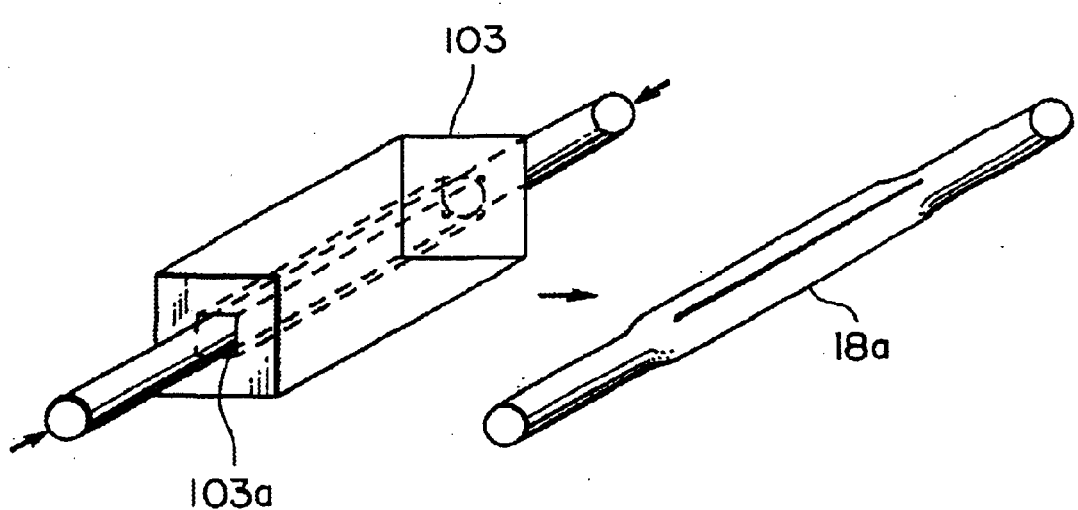
FIG. 15 is a schematic drawing showing a method of manufacturing a conductor of a stator for an alternator according to Embodiment 12 of the present invention.

FIG. 15 is a schematic drawing showing a method of manufacturing a conductor for a stator of an alternator according to Embodiment 12 of the present invention. A hole of rectangular cross section is formed along a center axis of a pressing die 103. In the present embodiment, portions of conductors of an approximately circular cross section throughout to be installed in the slots (straight portions 18a) are passed through the hole 103a of the pressing die 103 and pressed from both ends to an approximately rectangular cross section. Thus, a cross-sectional area of portions of the conductors to be installed in the slots becomes larger than the cross-sectional area of the conductors of the coil ends 19.

In the stator for an alternator according to the present embodiment, portions of the conductors to be installed in the slots are pressed so as to make a cross-sectional area thereof larger than a cross-sectional area of the conductors of the coil ends 19. Thus, the cost may be reduced because conductors of an approximately circular cross section are inexpensive, and since there is a small cross-sectional area at the coil ends 19, it is difficult for conductors to interfere with one another, a height of the coils ends may be reduced and the size of the entire alternator may also be reduced. Further, because an amount of material may be reduced, it is possible to lower the cost.

Embodiment 13

Figure 16:
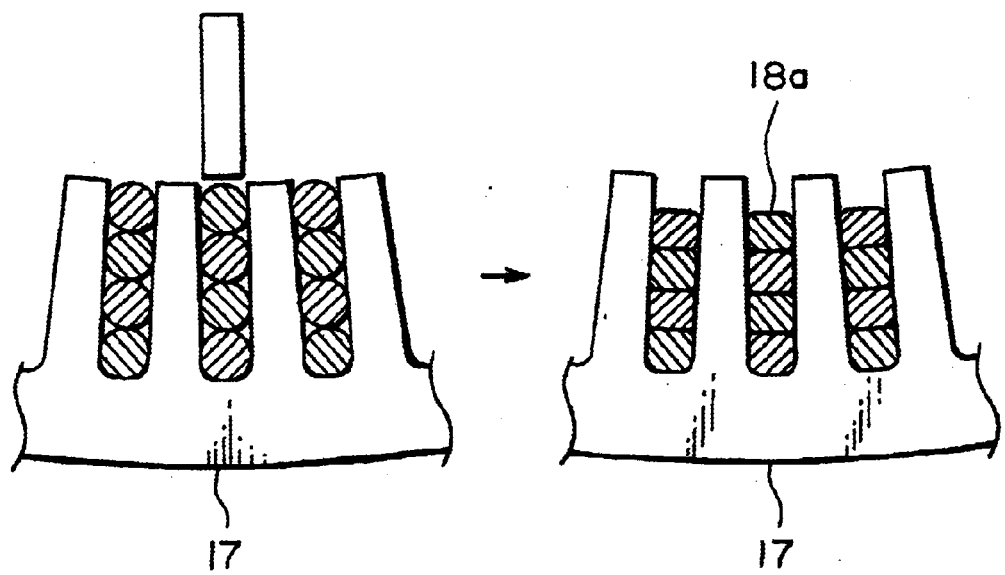
FIG. 16 is a schematic drawing showing a method of manufacturing a conductor of a stator for an alternator according to Embodiment 13 of the present invention.

FIG. 16 is a schematic drawing showing a method of manufacturing a conductor of a stator for an alternator according to Embodiment 13 of the present invention. In the present embodiment, conductors of an approximately circular cross section throughout are installed in slots of the stator core 17 and are pressed by a pressing die 104 so that portions thereof installed in the slots (straight portions 18a) are formed to an approximately rectangular cross section.

In the stator for an alternator according to the present embodiment, conductors of an approximately circular cross section throughout are installed in the slots and pressed to an approximately rectangular cross section. Thus, the cost may be reduced because conductors of an approximately circular cross section are inexpensive. Moreover, since pressing is performed in the slots, the space factor may be further increased.

Embodiment 14

FIGS. 17 to 20 are a schematic drawings showing sequential forming of a conductor of a stator for an alternator according to Embodiment 14 of the present invention. Pressing dies 105 to 107 include a wave-shaped die 111, a plurality of punches 112 for pressing the conductors to the die 111 and a pair of guides 113 for positioning the conductors. The pressing die 105 includes three (3) punches 112. The pressing die 106 includes five (5) punches 112. The pressing die 107 includes seven (7) punches 112. Each punch 112 is capable of moving toward and away from the die 111.

Figure 17:
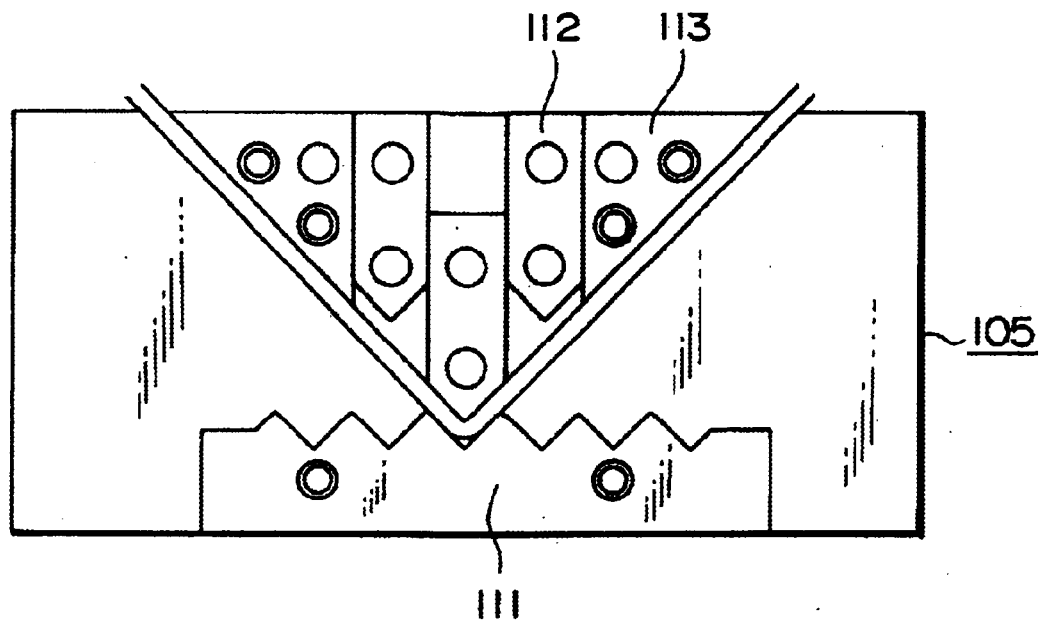
FIG. 17 is a schematic drawing showing sequential forming of a conductor of a stator for an alternator according to Embodiment 14 of the present invention.
Figure 18:
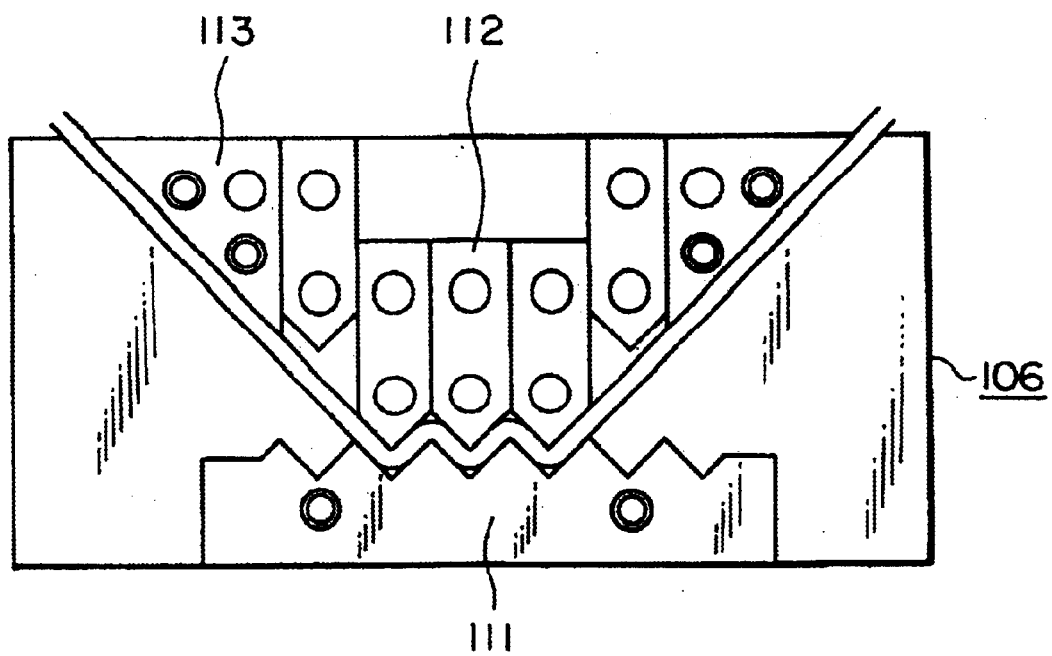
FIG. 18 is a schematic drawing showing sequential forming of a conductor of a stator for an alternator according to Embodiment 14 of the present invention.

Conductors of an approximately circular cross section throughout are sequentially pressed to the die 111 from a center position in FIG. 17 outwards by the plurality of punches 112 and slot insertion portions are changed to a wave shape.

Figure 21:
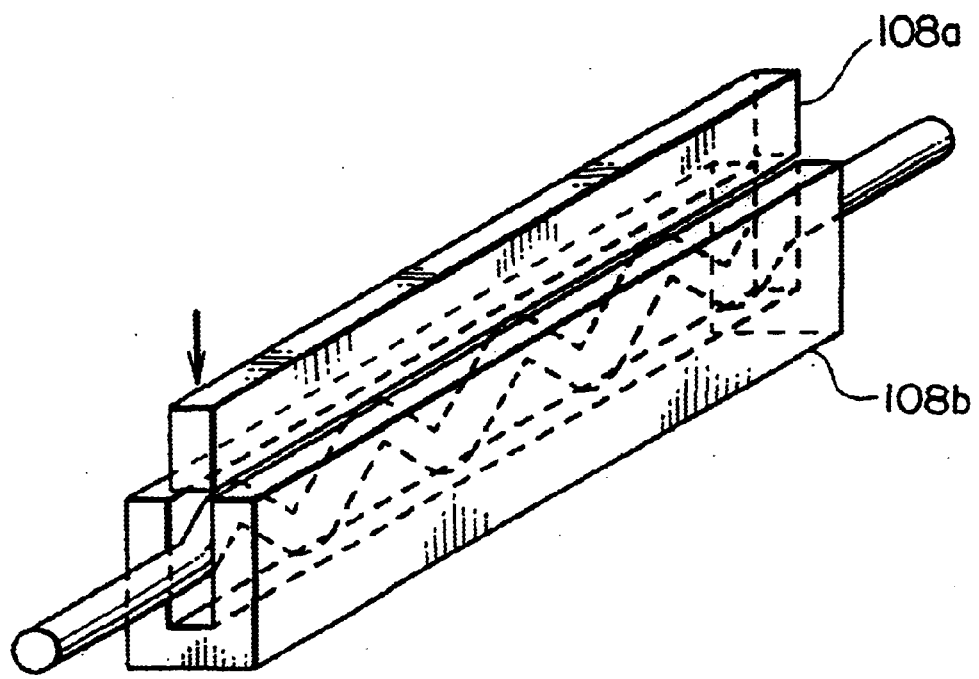
FIG. 21 is a schematic drawing showing a condition in which a portion, being changed into a wave shape, is subjected to pressing to render a roughly rectangular cross section.
Figure 22:
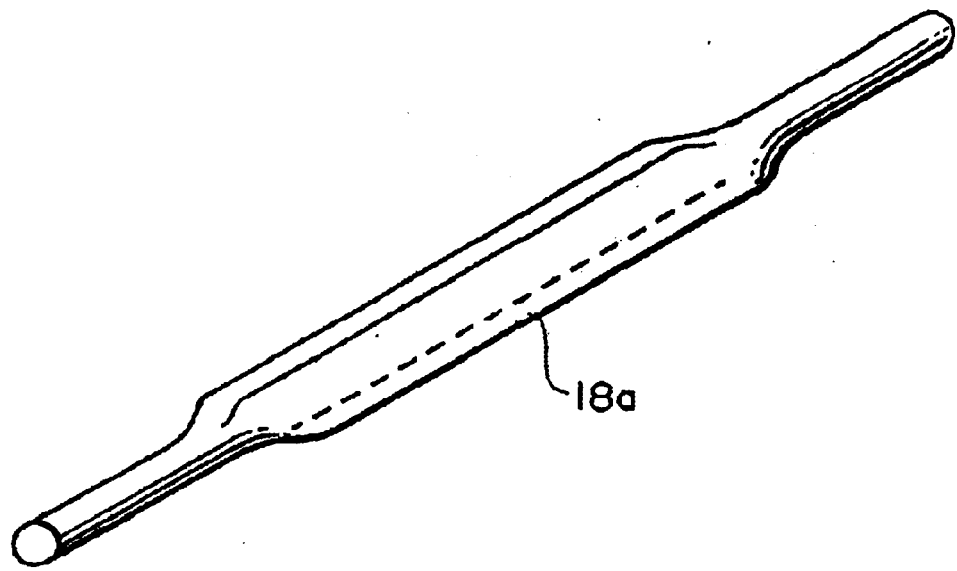
FIG. 22 is a perspective view of a portion of the conductor to be installed in the slots where a cross section thereof is formed to be roughly rectangular.

FIG. 21 is a schematic drawing showing a condition in which a portion, being changed into a wave shape, is subjected to pressing to render a roughly rectangular cross section. The portion changed to a wave shape is placed between pressing dies 108a, 108b and pressed. As shown in FIG. 22, a cross section of portions for installation in the slots (straight portions 18a) is formed to a roughly rectangular shape. A cross-sectional area of the roughly rectangular portion is larger than a cross-sectional area of the approximately circular portion.

In the stator for an alternator according to the present embodiment, only portions of the conductors of an approximately circular cross section throughout installed in the slots are changed to a wave shape, after which the wave shape portion is pressed to an approximately rectangular cross section. Thus, the cost may be reduced because conductors of an approximately circular cross section are inexpensive. Also a cross-sectional area of the potions of the conductors installed in the slots may be easily increased by forming the same into a wave shape.

Figure 23:
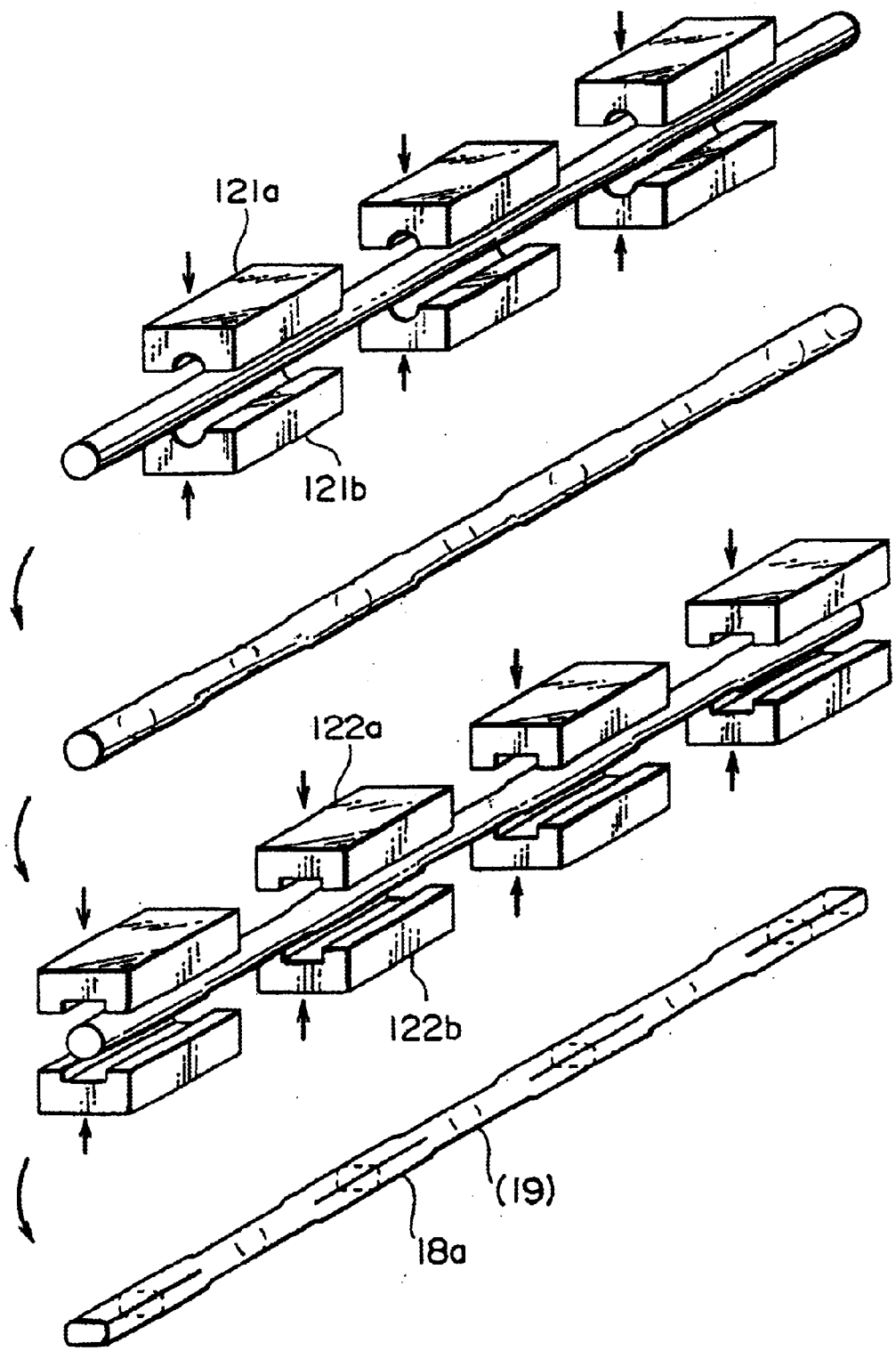
FIG. 23 is a schematic drawing showing a method of manufacturing a conductor of a stator for an alternator according to Embodiment 15 of the present invention.

FIG. 23 is a schematic drawing showing a method of manufacturing a conductor of a stator for an alternator according to Embodiment 15 of the present invention. In the present embodiment, portions of conductors having an approximately circular cross section throughout which are afterward to become coil ends 19 are placed between pressing dies 121a, 121b and pressed to a smaller circular cross section. The pressing dies 121a, 121b are intermittently disposed along the conductors.

Next, potions of a large cross-sectional area to be installed in the slots (straight portions 18a) are placed between pressing dies 122a, 122b and pressed to an approximately rectangular cross section.

In the stator for an alternator according to the present embodiment, portions of the conductors of an approximately circular cross section throughout to be installed in the slots are changed into a shape of large cross section compared to portions which become the coil ends, and then pressed to an approximately rectangular cross section. Hence, the cost may be reduced because conductors of an approximately circular cross section are inexpensive. Also a cross-sectional area of the potions of the conductors installed in the slots may be easily increased by transforming the same into a shape of large cross section.

Embodiment 16

Figure 24:
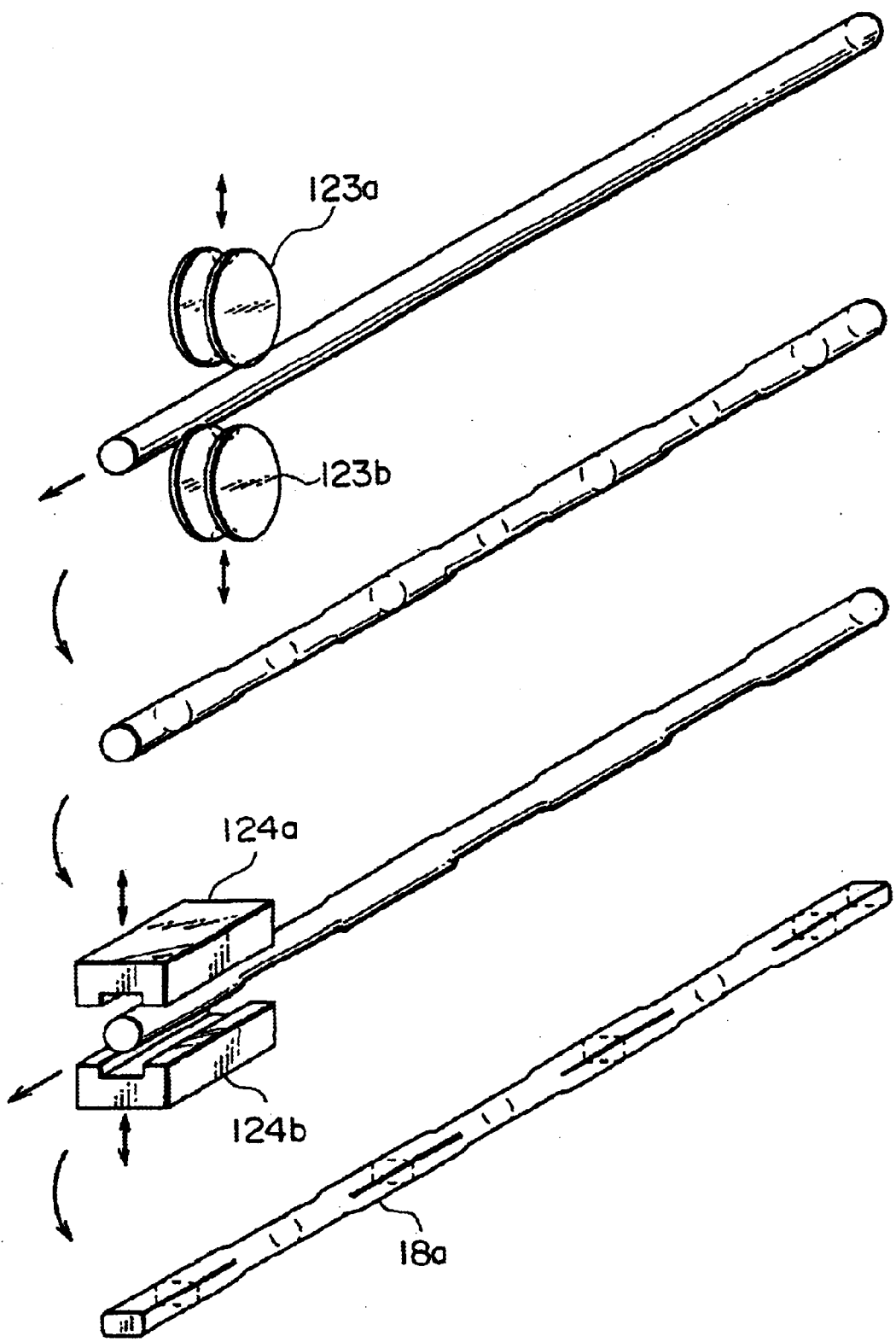
FIG. 24 is a schematic drawing showing a method of manufacturing a conductor for a stator of an alternator according to Embodiment 16 of the present invention.

FIG. 24 is a schematic drawing showing a method of manufacturing a conductor of a stator for an alternator according to Embodiment 16 of the present invention. In the present embodiment, conductors of an approximately circular cross section throughout are moved in the direction of the arrow in the figure and are intermittently rolled between roller dies 123a, 123b so that portions which are afterward to become the coil ends 19 are formed to have a small circular cross section.

Next, portions of a large cross-sectional area to be installed in the slots (straight portions 18a) are pressed between press dies 124a, 124b to an approximately rectangular cross section while moving the conductors in the direction of the arrow in the drawing.

In the stator for an alternator according to the present embodiment, portions of the conductors of an approximately circular cross section throughout to be installed in the slots are changed into a shape of large cross section compared to portions which become the coil ends, and then pressed to an approximately rectangular cross section. Hence, the cost may be reduced because conductors of an approximately circular cross section are inexpensive. Also a cross-sectional area of the potions of the conductors installed in the slots may be easily increased by transforming the same into a shape of large cross section.

Embodiment 17

Figure 25:
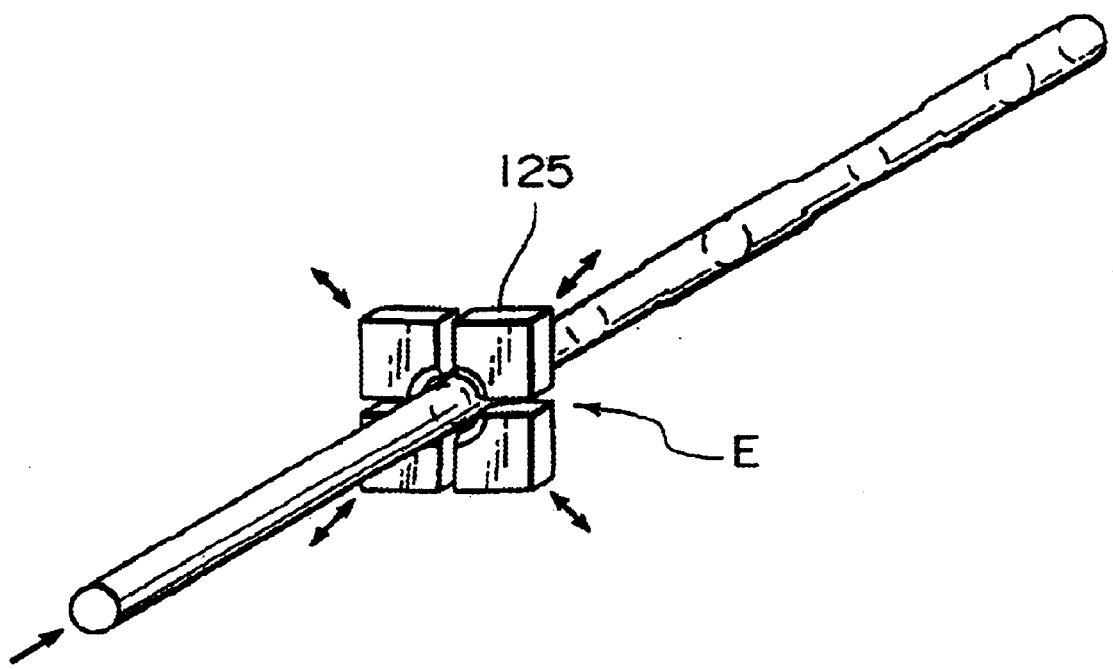
FIG. 25 is a schematic drawing showing a method of manufacturing a conductor of a stator for an alternator according to Embodiment 17 of the present invention.
Figure 26:
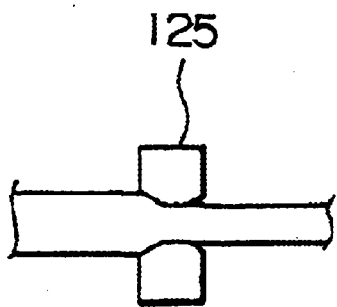
FIG. 26 is a side elevation as viewed from the arrow E in FIG. 25.

FIG. 25 is a schematic drawing showing a method of manufacturing a conductor of a stator for an alternator according to Embodiment 17 of the present invention. FIG. 26 is a side elevation as viewed from the arrow E in FIG. 25. In the present embodiment, conductors of an approximately circular cross section throughout are pushed in the direction of the arrow in the figure and are intermittently drawn by means of a drawing jig 125 so that portions which are afterward to become the coil ends 19 are formed to have a small circular cross section.

Then, portions of a large cross-sectional area to be installed in the slots (straight portions 18a) are placed between pressing dies and pressed to an approximately rectangular cross section according to the method in Embodiment 15 or 16.

In the stator for an alternator according to the present embodiment, portions of the conductors of an approximately circular cross section throughout to be installed in the slots are changed into a shape of large cross section compared to portions which become the coil ends, and then pressed to an approximately rectangular cross section. Hence, the cost may be reduced because conductors of an approximately circular cross section are inexpensive. Also a cross-sectional area of the potions of the conductors installed in the slots may be easily increased by transforming the same into a shape of large cross section.

Embodiment 18

Figure 27:
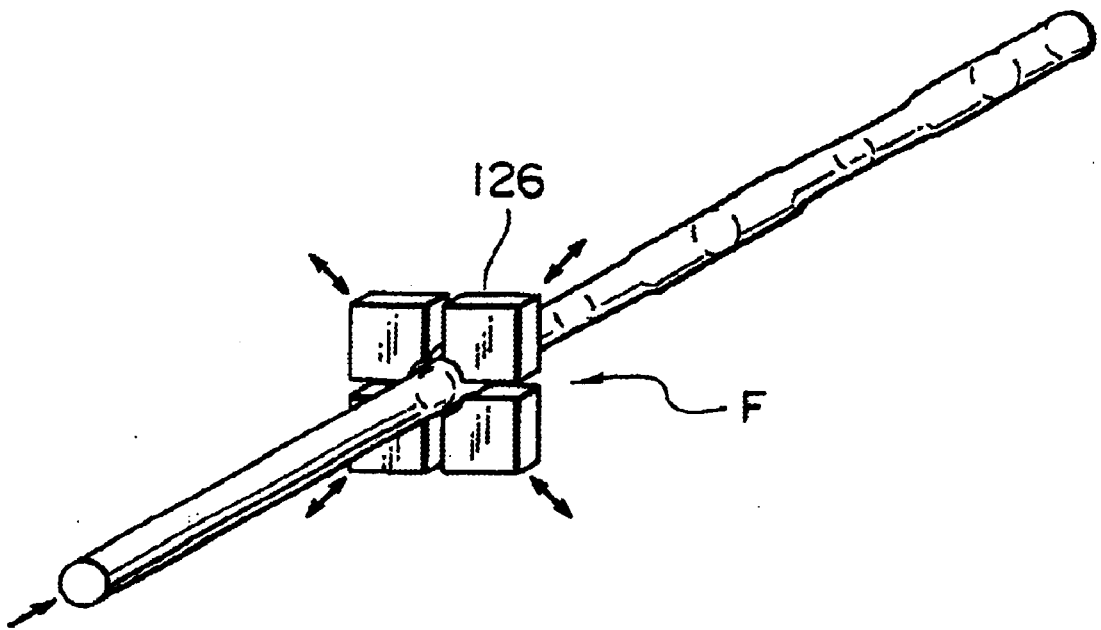
FIG. 27 is a schematic drawing showing a method of manufacturing a conductor of a stator for an alternator according to Embodiment 18 of the present invention.
Figure 28:
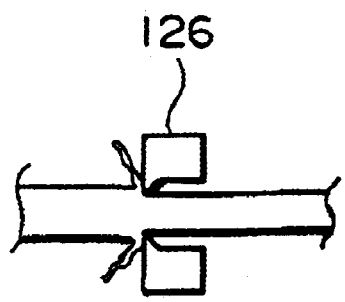
FIG. 28 is a side elevation as viewed from the arrow F in FIG. 27.
Figure 29:
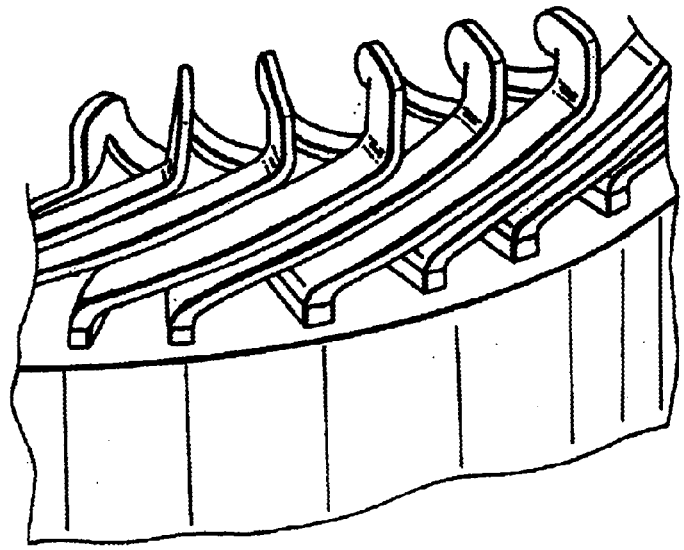
FIG. 29 is a perspective view showing a coil end of a stator of a conventional automotive alternator.
Figure 30:
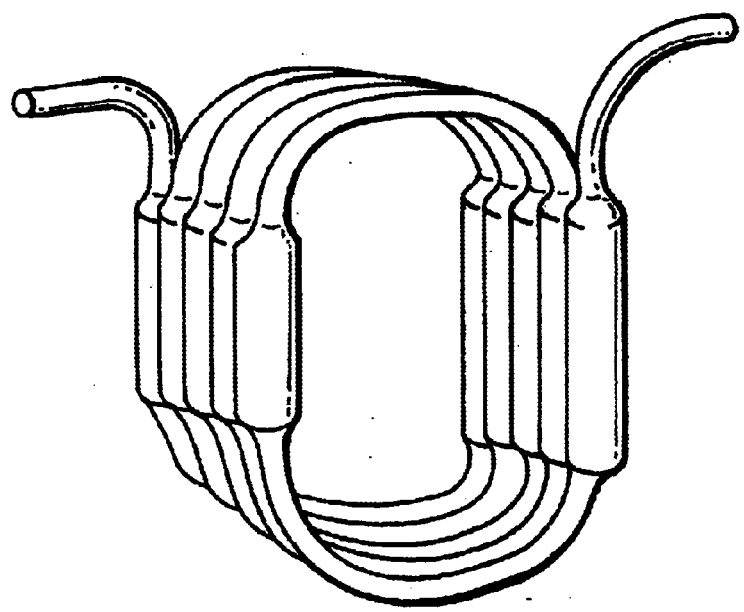
FIG. 30 is a perspective view showing a stator coil of a conventional automotive alternator.

FIG. 27 is a schematic drawing showing a method of manufacturing a conductor of a stator for an alternator according to Embodiment 18 of the present invention. FIG. 28 is a side elevation as viewed from the arrow F in FIG. 27. In the present embodiment, conductors of an approximately circular cross section throughout are pushed in the direction of the arrow in the figure and a surface layer thereof is intermittently peeled by means of a peeling jig 126 so that portions which are afterward to become the coil ends 19 are formed to have a small circular cross section.

Then, portions of a large cross-sectional area to be installed in the slots (straight portions 18a) are placed between pressing dies and pressed to an approximately rectangular cross section according to the method in Embodiment 15 or 16.

With the stator for an alternator according to the present embodiment, effects similar to those in Embodiment 17 may also be achieved.

In order to achieve the above object, according to one aspect of the present invention, there is provided, a stator for an alternator comprising:
    a stator core fixed to a case and facing a rotor, and formed in a circumferential direction with a number of radially extending slots of a rectangular cross section; and a stator coil installed in the slots of the stator core; and
    the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction to form coil end groups, and, a cross-section of at least a principal portion of the stator coil inside the slots is approximately rectangular, a cross-section of at least a portion including end portions of the coil ends is approximately circular or approximately elliptic, and a cross-sectional area of the approximately rectangular cross-sectional portion differs from that of the approximately circular cross-sectional portion or the approximately elliptic cross sectional portion.

In the above stator, since a cross-section of at least a principal portion of the stator coil inside the slots is approximately rectangular, it is possible to increase a space factor of a stator coil in slots and increase a cross-sectional area of the stator coil and thus, a resistance of the stator coil maybe reduced and an output voltage increased. Moreover, since it is possible to increase a thickness of stator teeth, magnetic resistance of magnetic flux interlinking the stator coil may be reduced, and further, since magnetic flux density is reduced such that is difficult for magnetic saturation to occur, output may be increased. Furthermore, because a cross section of the stator coil at the coil ends is approximately circular or approximately elliptic, it is difficult for conductors to interfere with one another, a height of the coils ends may be reduced and the size of the entire alternator may also be reduced. Also, since it is possible to reduce the height of the coil ends, coil resistance and coil end leakage inductance may be reduced and output may be increased. Further, because an amount of material may be reduced, it is possible to lower the cost. And even in the case where conductors contact one another, since the conductors are of an approximately circular cross section with a large radius of curvature, the contact stress is small and it is difficult for the insulating coating to become damaged. Moreover, because a cross section of an intersecting portion of adjacent coil ends is roughly circular, it is difficult for forming irregularities to cause a difference in shape in the coil ends and the forming of the coil is simplified.

According to another aspect of the present invention there is provided a stator for an alternator wherein:

a cross section the conductors comprising the coil ends is approximately circular or approximately elliptic throughout a substantial entirety of the conductors. Hence, the forming of the coil is facilitated because it is difficult for differences in shape to develop due to forming irregularities in the coil ends.

According to yet another aspect of the present invention there is provided a stator for an alternator wherein:

a cross-sectional area of the conductors inside the slots is larger than a cross-sectional area of the conductors comprising the coil ends. Thus, since there is a small cross-sectional area at the coil ends, it is made further difficult for conductors to interfere with one another, a height of the coils ends may be reduced and the size of the entire alternator may also be reduced. Further, because an amount of material may be reduced, it is possible to lower the cost.

According to still yet another aspect of the present invention there is provided a stator for an alternator wherein:

the stator coil comprises a plurality of U-shaped conductor segments, end portions thereof being joined to each other, and at least a cross section of a portion including ends of turn portions of the U-shaped conductor segments is approximately circular or approximately elliptic. Thus, since stator coil comprises a plurality of U-shaped conductor segments, end portions thereof being joined to each other, and the conductor segments are separate before being joined to each other, the cross-sectional shape is easily changed before conductor segments are formed into U-shapes.

According to still yet another aspect of the present invention there is provided a stator for an alternator wherein:

a cross section of end portions of the U-shaped conductor segments is approximately circular or approximately elliptic. Thus, since a cross section of the end portions is approximately circular or approximately elliptic, it is difficult for conductors at the joining side to interfere with one another after they are joined. Also, welding of the joining portions is facilitated. Furthermore, compared to a coil of a rectangular cross section, it is difficult for corner portions to be scratched and alignment and the joining process are facilitated. Moreover, insertion in the rectifier connecting terminal of coil extending portions for connecting to the rectifier is facilitated.

According to still yet another aspect of the present invention there is provided a stator for an alternator wherein:

the stator coil comprises a continuous conductor wound so as to alternately occupy an inner layer and an outer layer in a slot depth direction within the slots at intervals of a predetermined number of slots, the conductor being bent back outside the slots at both sides of the stator core. Hence, since the stator coil comprises the continuous conductor the height of the coil ends can be reduced at both axial ends. Also, when mounting the coil in the slots, because a cross section of the coil has a large radius of curvature, it is possible to reduce contact stress and keep the coil from becoming damaged even in the case where coils contact each other at coil ends.

According to still yet another aspect of the present invention there is provided a stator for an alternator wherein:

a plurality of the conductors are disposed in a radial direction of the slots, and a cross section of the conductors in the slots is an approximately rectangular shape having long sides in a radial direction. Thus, since it is possible to maintain a cross-sectional area and enlarge the gap between coil ends by making the cross section of the conductors in the slots an approximately rectangular shape having long sides in a radial direction, and further, since a height of the coil ends may be lowered and the teeth may be wide, it is difficult for magnetic saturation to occur and output is improved.

According to still yet another aspect of the present invention there is provided a stator for an alternator wherein:

the conductors comprise four (4) or more layers in the slots, and the stator coil comprises two (2) or more rows of coil end groups. Hence, interference among coil end groups is avoided, and since a cross section of the conductors has a large radius of curvature, contact stress is reduced even in a case where coil end groups contact one another and the coil may be prevented from being damaged. Also, since the number of turns is increased, the output may be increased, and a height of the coil ends may be lowered and the entire alternator may constructed in a small size.

According to still yet another aspect of the present invention there is provided a stator for an alternator wherein:

a hardness of the conductors of the coil ends is less than that of the conductors in the slots. Hence, the bending of the coil ends is facilitated.

According to still yet another aspect of the present invention there is provided a stator for an alternator wherein:

the rotor further comprises a air-cooling fan being rotationally driven together with the rotor. Thus, because the air-cooling fan as a blowing means is provided, cooling may be positively performed, also, since the coil ends are low, ventilating resistance is reduced and cooling characteristics are improved, further, wind noise is reduced.

According to still yet another aspect of the present invention there is provided a stator for an alternator wherein:

a varnish or resin is applied to the coil end groups. Thus, because gaps between coil ends are embedded with varnish or resin, insulating characteristics are improved. Moreover, the fixing strength of coil ends to each other is increased and vibration resisting characteristics are improved. Furthermore, because a height of the coil ends is low, only a small amount of varnish or resin is needed in application and cost is reduced, also, the varnish applying process is simplified.

According to still yet another aspect of the present invention there is provided a stator for an alternator wherein:

portions corresponding to coil ends in the conductors of an approximately rectangular cross section throughout are pressed and made to an approximately circular cross section or approximately elliptic cross section. Thus, because conductors of an approximately rectangular cross section are pressed and employed, the (number of) portions to be pressed are reduced and the forming process is facilitated.

According to still yet another aspect of the present invention there is provided a stator for an alternator wherein:

portions of the conductors of an approximately circular cross section throughout installed in the slots are pressed and made to an approximately rectangular cross section. Hence, the cost may be reduced because conductors of an approximately circular cross section are inexpensive.

According to still yet another aspect of the present invention there is provided a stator for an alternator wherein:

portions of the conductors installed in the slots are pressed so as to make a cross-sectional area thereof larger than a cross-sectional area of the conductors of the coil ends. Thus, the cost may be reduced because conductors of an approximately circular cross section are inexpensive, and since there is a small cross-sectional area at the coil ends, it further difficult for conductors to interfere with one another, a height of the coils ends may be reduced and the size of the entire alternator may also be reduced. Further, because an amount of material may be reduced, it is possible to lower the cost.

According to still yet another aspect of the present invention there is provided a stator for an alternator wherein:

portions of the conductors of an approximately circular cross section throughout are installed in the slots and pressed to an approximately rectangular cross section. Thus, the cost may be reduced because conductors of an approximately circular cross section are inexpensive. Moreover, since pressing is performed in the slots, the space factor may be further increased.

According to still yet another aspect of the present invention there is provided a stator for an alternator wherein:

only portions of the conductors of an approximately circular cross section throughout installed in the slots are changed to a wave shape, after which the wave shape portion is pressed to an approximately rectangular cross section. Thus, the cost may be reduced because conductors of an approximately circular cross section are inexpensive. Also a cross-sectional area of the potions of the conductors installed in the slots may be easily increased by forming the same into a wave shape.

According to still yet another aspect of the present invention there is provided a stator for an alternator wherein:

portions of the conductors of an approximately circular cross section throughout installed in the slots are changed into a shape of large cross section and then pressed to an approximately rectangular cross section. Hence, the cost may be reduced because conductors of an approximately circular cross section are inexpensive. Also a cross-sectional area of the potions of the conductors installed in the slots may be easily increased by transforming the same into a shape of large cross section.

According to still yet another aspect of the. present invention there is provided a method of manufacturing a stator for an alternator including, in a stator for an alternator comprising:
a stator core fixed to a case and facing a rotor, and formed in a circumferential direction with a number of radially extending slots of a rectangular cross section; and a stator coil installed in the slots of the stator core; and
the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction to form coil end groups, and, a cross-section of at least a principal portion of the stator coil inside the slots is approximately rectangular, a cross-section of at least a portion including end portions of the coil ends is approximately circular or approximately elliptic and a cross-sectional area of the approximately rectangular cross-sectional portion differs from that of the approximately circular cross-sectional portion or the approximately elliptic cross-sectional portion, a circular shape forming process for pressing portions corresponding to coil ends in the conductors of an approximately rectangular cross section throughout into an approximately circular cross section or approximately elliptic cross section. Thus, because conductors of an approximately rectangular cross section are pressed and employed, the portions to be pressed are reduced and the forming process is facilitated.

According to still yet another aspect of the present invention there is provided a method of manufacturing a stator for an alternator including, in a stator for an alternator comprising:
a stator core fixed to a case and facing a rotor, and formed in a circumferential direction with a number of radially extending slots of a rectangular cross section; and a stator coil installed in the slots of the stator core; and
the stator coil comprising wire-shaped conductors wound so as to alternately occupy an inner layer and an outer layer in a slot depth direction within the slots at intervals of a predetermined number of slots, the conductors being bent back outside the slots at axial end surfaces of the stator core to form a plurality of turn portions, the plurality of turn portions being bent back in a similar shape inclined with respect to an outer circumferential surface of the stator core and so as to align in rows in a circumferential direction to form coil end groups, and, a cross-section of at least a principal portion of the stator coil inside the slots is approximately rectangular, a cross-section of at least a portion including end portions of the coil ends is approximately circular or approximately elliptic and a cross-sectional area of the approximately rectangular cross-sectional portion differs from that of the approximately circular cross-sectional portion or the approximately elliptic cross-sectional portion, a rectangular shape forming process for pressing portions of the conductors of an approximately circular cross section throughout installed in the slots into an approximately rectangular cross section. Hence, the cost may be reduced because conductors of an approximately circular cross section are inexpensive.

According to still yet another aspect of the present invention there is provided a method of manufacturing a stator coil for an alternator wherein:

the rectangular shape forming process presses portions of the conductors installed in the slots so as to make a cross-sectional area thereof larger than a cross-sectional area of the conductors of the ends. Thus, the cost may be reduced because conductors of an approximately circular cross section are inexpensive, and since there is a small cross-sectional area at the coil ends, it further difficult for conductors to interfere with one another, a height of the coils ends may be reduced and the size of the entire alternator may also be reduced. Further, because an amount of material may be reduced, it is possible to lower the cost.

According to still yet another aspect of the present invention there is provided a method of manufacturing a stator coil for an alternator wherein:

the rectangular shape forming process presses the conductors of an approximately circular cross section throughout to an approximately rectangular cross section after the conductors are installed in the slots. Thus, the cost may be reduced because conductors of an approximately circular cross section are inexpensive. Moreover, since pressing is performed in the slots, the space factor may be further increased.

According to still yet another aspect of the present invention there is provided a method of manufacturing a stator coil for an alternator wherein:

in the rectangular shape forming process, only portions of the conductors of an approximately circular cross section throughout installed in the slots are processed to a wave shape, after which the wave shape portion is pressed to an approximately rectangular cross section. Thus, the cost may be reduced because conductors of an approximately circular cross section are inexpensive. Also a cross-sectional area of the potions of the conductors installed in the slots may be easily increased by forming the same into a wave shape.

According to still yet another aspect of the present invention there is provided a method of manufacturing a stator coil for an alternator wherein:

in the rectangular shape forming process, portions of the conductors of an approximately circular cross section throughout installed in the slots are processed into a shape of large cross section and then pressed to an approximately rectangular cross section. Hence, the cost may be reduced because conductors of an approximately circular cross section are inexpensive. Also a cross-sectional area of the potions of the conductors installed in the slots may be easily increased by transforming the same into a shape of large cross section.

What is claimed is:

1. A stator for an alternator comprising:
   a stator core fixed to a case and facing a rotor, and formed in a circumferential direction with a number of radially extending slots of a rectangular cross section; and
   a stator coil installed in said slots of said stator core,
   wherein said stator coil is formed into a predetermined shape prior to installation in said slots; and
   said stator coil comprising wire-shaped conductors wound so as to alternately occupy an inner layer and an outer layer in a slot depth direction within said slots at intervals of a predetermined number of slots,
   said conductors comprising:
      straight portions disposed within said slots of said stator core,
      a plurality of turn portions being bent back outside said slots at axial end surfaces of said stator core, said plurality of turn portions being bent back in a similar shape inclined with respect to an outer circumferential surface of the stator core and so as to align in rows in a circumferential direction and form coil end groups, and;
      end portions being bent outside said slots at an axial end surfaces of said stator core, said end portions comprising a portion that is inclined with respect to an outer circumferential surface of the stator core and so as to align in rows in a circumferential direction and form coil end groups,
   wherein
      a cross-section of at least a principal portion of said straight portion of said stator coil inside said slots is approximately rectangular,
      a cross-section of at least a portion including said plurality of turn portions and said end portions of said coil is approximately circular or approximately elliptic,
      a cross-sectional area of said approximately rectangular cross-sectional portion differs from that of said approximately circular cross-sectional portion or said approximately elliptic cross-sectional portion.

2. The stator for an alternator according to claim 1 wherein:
   a cross section said conductors comprising said plurality of turn portions and said end portions is approximately circular or approximately elliptic throughout a substantial entirety of said conductors.

3. The stator for an alternator according to claim 1 wherein:
   a cross-sectional area of said conductors inside said slots is larger than a cross-sectional area of said conductors comprising said coil ends.

4. The stator for an alternator according to claim 1 wherein:
   said wire-shaped conductors of said stator coil comprises a plurality of U-shaped conductor segments, end portions thereof being joined to each other, and a cross section of at least a portion including said end portions of said U-shaped conductor segments is approximately circular or approximately elliptic,
   said end portions being bent outside said slots at an axial end surfaces of said stator core, said end portions comprising a portion that is inclined with respect to an outer circumferential surface of said stator core and a portion that is perpendicular to said outer circumferential surface of said stator core so as to align in rows in a circumferential direction and form coil end groups, and
   said straight portions of said end portions are joined to each other.

5. The stator for an alternator according to claim 4 wherein:
   a cross section of said end portions of said U-shaped conductor segments is approximately circular or approximately elliptic.

6. The stator for an alternator according to claim 1 wherein:
   said wire-shaped conductors of said stator coil comprises a continuous conductor wound so as to alternately occupy an inner layer and an outer layer in a slot depth direction within said slots at intervals of a predetermined number of slots,
   said continuous conductor comprising a plurality of turn portions being bent back outside said slots at both sides of said stator core, and each successive one of said plurality of turn portions of said continuous conductor being disposed on alternating sides of said stator core.

7. The stator for an alternator according to claim 1 wherein:

a plurality of said conductors are disposed in a radial direction of said slots, and a cross section of said conductors in said slots is an approximately rectangular shape having long sides in a radial direction.

8. The stator for an alternator according to claim 1 wherein:

said conductors comprise four (4) or more layers in said slots, and said stator coil comprises two (2) or more rows of coil end groups.

9. The stator for an alternator according to claim 1 wherein:

said rotor further comprises a air-cooling fan being rotationally driven together with said rotor.

10. The stator for an alternator according to claim 1 wherein:

a varnish or resin is applied to said coil end groups.

11. The stator for an alternator according to claim 1 wherein:

portions corresponding to coil ends in said conductors of an approximately rectangular cross section throughout are pressed and made to an approximately circular cross section or approximately elliptic cross section.

12. The stator for an alternator according to claim 1 wherein:

portions of said conductors of an approximately circular cross section throughout installed in said slots are pressed and made to an approximately rectangular cross section.

13. The stator for an alternator according to claim 12 wherein:

portions of said conductors installed in said slots are pressed so as to make a cross-sectional area thereof larger than a cross-sectional area of said conductors of said coil ends.

14. The stator for an alternator according to claim 12 wherein:

portions of said conductors of an approximately circular cross section throughout are installed in said slots and pressed to an approximately rectangular cross section.

15. The stator for an alternator according to claim 12 wherein:

only portions of said conductors of an approximately circular cross section throughout installed in said slots are changed to a wave shape, after which said wave shape portion is pressed to an approximately rectangular cross section.

16. The stator for an alternator according to claim 12 wherein:

portions of said conductors of an approximately circular cross section throughout installed in said slots are changed into a shape of large cross section and then pressed to an approximately rectangular cross section.

17. A stator for an alternator comprising:

a stator core fixed to a case and facing a rotor, and formed in a circumferential direction with a number of radially extending slots of a rectangular cross section; and a stator coil installed in said slots of said stator core, wherein said stator coil is formed into a predetermined shape prior to installation in said slots; and said stator coil comprising wire-shaped conductors wound so as to alternately occupy an inner layer and an outer layer in a slot depth direction within said slots at intervals of a predetermined number of slots, said conductors being bent back outside said slots at axial end surfaces of said stator core to form a plurality of turn portions, said plurality of turn portions being bent back in a similar shape inclined with respect to an outer circumferential surface of the stator core and so as to align in rows in a circumferential direction and form coil end groups, and, a cross-section of at least a principal portion of said stator coil inside said slots is approximately rectangular, a cross-section of at least a portion including end portions of said coil end is approximately circular or approximately elliptic, and a cross-sectional area of said approximately rectangular cross-sectional portion differs from that of said approximately circular cross-sectional portion or said approximately elliptic cross-sectional portion, wherein a hardness of said conductors of said coil ends is less than that of said conductors in said slots.

* * * * *